United States Patent
Jia et al.

(10) Patent No.: US 12,200,764 B2
(45) Date of Patent: *Jan. 14, 2025

(54) METHOD AND DEVICE FOR MANAGING CHANNEL OCCUPANCY DURATION OF UNLICENSED FREQUENCY BAND

(71) Applicant: HUAWEI TECHNOLOGIES CO., LTD., Shenzhen (CN)

(72) Inventors: Qiong Jia, Shanghai (CN); Jun Zhu, Shenzhen (CN); Ji Wu, Shanghai (CN); Kwang-Cheng Chen, Tampa, FL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

This patent is subject to a terminal disclaimer.

(21) Appl. No.: 17/695,332

(22) Filed: Mar. 15, 2022

(65) Prior Publication Data

US 2022/0279576 A1    Sep. 1, 2022

Related U.S. Application Data

(63) Continuation of application No. 16/930,473, filed on Jul. 16, 2020, now Pat. No. 11,297,648, which is a (Continued)

(30) Foreign Application Priority Data

Jan. 19, 2018  (CN) .......................... 201810054292.5
Aug. 21, 2018  (CN) .......................... 201810954297.3

(51) Int. Cl.
H04W 74/0808    (2024.01)
H04L 5/00    (2006.01)
H04W 16/14    (2009.01)

(52) U.S. Cl.
CPC ....... *H04W 74/0808* (2013.01); *H04L 5/0082* (2013.01); *H04W 16/14* (2013.01)

(58) Field of Classification Search
CPC ............. H04W 74/0808; H04W 16/14; H04W 72/535; H04W 74/04; H04W 72/0446;
(Continued)

(56) References Cited

U.S. PATENT DOCUMENTS 8,761,680 B2    6/2014    Lee
10,587,390 B2    3/2020    Kwak
(Continued)

FOREIGN PATENT DOCUMENTS

CN    105578573 A    5/2016
CN    106413118 A    2/2017
(Continued)

OTHER PUBLICATIONS

ETSI, "Harmonized European Standard"European Telecommunications Standards Institute 2015, Jan. 1, 2015, total 110 pages.
(Continued)

*Primary Examiner* — Ashley Shivers
(74) *Attorney, Agent, or Firm* — Rimon PC

(57) ABSTRACT

This application discloses a wireless communication method, including: receiving, by a network device, uplink transmission of a first terminal in first duration of channel occupancy duration of the first terminal, where the channel occupancy duration of the first terminal further includes second duration, and the second duration is later than the first duration; and performing, by the network device, downlink transmission in the second duration, where a sum of the first duration and the second duration is less than or equal to the channel occupancy duration of the first terminal. This application further discloses a network device and a terminal that correspond to the wireless communication method. By
(Continued)

applying the method and devices, a resource obtained through contention by a terminal applied to an unlicensed frequency band can be properly used, to improve operating efficiency of the unlicensed frequency band.

14 Claims, 9 Drawing Sheets

Related U.S. Application Data continuation of application No. PCT/CN2018/124991, filed on Dec. 28, 2018.

(58) Field of Classification Search
CPC ............. H04W 72/1263; H04L 5/0082; H04L 5/0053
See application file for complete search history.

(56) References Cited

U.S. PATENT DOCUMENTS

| | | |
|---|---|---|
| 2013/0237216 A1 | 9/2013 | Ong |
| 2016/0337869 A1 | 11/2016 | Dai et al. |
| 2017/0238233 A1 | 8/2017 | Oh |
| 2018/0220464 A1 | 8/2018 | Wang |
| 2018/0324778 A1 | 11/2018 | Farajidana |
| 2019/0103901 A1 | 4/2019 | Liu |
| 2019/0141702 A1 | 5/2019 | Li |
| 2019/0200386 A1 | 6/2019 | Yang |
| 2019/0342037 A1* | 11/2019 | Karaki ................. H04W 72/04 |
| 2020/0028640 A1* | 1/2020 | Yeo ..................... H04L 5/0007 |
| 2020/0100286 A1 | 3/2020 | Xu |
| 2020/0112385 A1 | 4/2020 | Yang |

FOREIGN PATENT DOCUMENTS

| | | |
|---|---|---|
| CN | 106851839 A | 6/2017 |
| CN | 106922032 A | 7/2017 |
| CN | 108366431 A | 8/2018 |
| WO | 2016120436 A1 | 8/2016 |

OTHER PUBLICATIONS

Ericsson ,"on AUL Channel Access", 3GPP TSG-RAN WG1 Meeting #91 , R1-1720374 , Reno, USA, Nov. 27, 2017, total 8 pages.
ZTE , "Discussion on the UL LBT for LAA", 3GPP TSG RAN WG1 Meeting #85, R1-164603 , Nanjing, China May 23, 2016, total 10 pages.
3GPP TS 38.214 V15.0.0 (Dec. 2017), 3rd Generation Partnership Project; Technical Specification Group Radio Access Network; NR; Physical layer procedures for data (Release 15), 71 pages.
3GPP TS 38.211 V15.0.0 (Dec. 2017), 3rd Generation Partnership Project; Technical Specification Group Radio Access Network; NR; Physical channels and modulation(Release 15), 73 pages.

\* cited by examiner

METHOD AND DEVICE FOR MANAGING CHANNEL OCCUPANCY DURATION OF UNLICENSED FREQUENCY BAND

CROSS-REFERENCE TO RELATED APPLICATIONS

This application is a continuation of U.S. patent application Ser. No. 16/930,473, now U.S. Pat. No. 11,297,648, filed on Jul. 16, 2020, which is a continuation of International Application No. PCT/CN2018/124991, filed on Dec. 28, 2018. The International Application claims priority to Chinese Patent Application No. 201810954297.3, filed on Aug. 21, 2018 and Chinese Patent Application No. 201810054292.5, filed on Jan. 19, 2018. All of the aforementioned patent applications are hereby incorporated by reference in their entireties.

TECHNICAL FIELD

This application relates to the field of communications technologies, and in particular, to a communications technology for managing or using channel occupancy duration in an unlicensed frequency band scenario.

BACKGROUND

Rapid development of wireless communications technologies leads to increasing shortage of spectrum resources, driving exploration on unlicensed frequency bands. 3GPP introduces a licensed-assisted access (License Assisted Access, LAA) technology and an enhanced licensed-assisted access (enhanced LAA, eLAA) technology respectively to Release 13 (Release 13, R-13) and Release 14 (Release 14, R-14), so that an unlicensed spectrum resource is used to a maximum extent by means of assistance of a licensed spectrum.

A communications system deployed in an unlicensed frequency band usually uses or shares a radio resource in a contention manner. To ensure fairness, a device that performs transmission on the unlicensed frequency band usually needs to comply with a listen before talk (listen before talk, LBT) rule. In other words, before a signal is sent, channel listening needs to be performed first, and transmission starts when the channel is idle and a channel occupancy time is obtained.

In a 5th generation (5th generation, 5G) new radio (New Radio, NR) system, application of the unlicensed frequency band is still a technical means for meeting a service requirement and improving user experience. In the prior art, after obtaining a maximum channel occupancy time (maximum channel occupancy time, MCOT), a base station may share the maximum channel occupancy time with a terminal for uplink transmission. However, a mechanism about how to effectively use a remaining MCOT of the terminal when the MCOT is not used up in uplink transmission is not provided.

SUMMARY

Embodiments of this application provide a wireless communication method, a network device, and a terminal that are applied to an unlicensed frequency band. The network device manages a channel occupancy time obtained by the terminal when a result of the channel listening is idle, so that the channel occupancy time can be effectively used, and the foregoing problem is resolved.

To achieve the foregoing objective, the embodiments of this application provide the following technical solutions.

According to a first aspect, this application provides a wireless communication method based on a network device, where in the method, one or more terminals may be scheduled to perform uplink transmission, or interact with a terminal operating in a grant-free transmission manner. The method includes: receiving, by a network device, uplink transmission of a first terminal in a part of channel occupancy duration (duration) of the first terminal; and after the uplink transmission of the first terminal ends, performing, by the network device, downlink transmission in a remaining part of the channel occupancy duration of the first terminal other than the part of the channel occupancy duration used to receive the uplink transmission of the first terminal.

In a possible design, the network device receives the uplink transmission of the first terminal in first duration of the channel occupancy duration of the first terminal, where the channel occupancy duration of the first terminal further includes second duration, and the second duration is later than the first duration; and the network device performs downlink transmission in the second duration, where a sum of the first duration and the second duration is less than or equal to the channel occupancy duration of the first terminal.

In an application scenario of the unlicensed frequency band, the uplink transmission of the terminal and the downlink transmission of the network device are performed in the channel occupancy duration (or referred to as "maximum channel occupancy duration") of the terminal, and when the channel occupancy duration cannot be used up during the uplink transmission of the terminal, the channel occupancy duration may be shared with the network device for downlink transmission, so that a channel occupancy time of the terminal can be effectively used.

In a possible design, there is at least one time interval between the first duration and the second duration. This is because there may be a time interval between the uplink transmission of the terminal and the downlink transmission of the network device. The time interval may be caused by, for example, that downlink transmission data or signaling of the network device is not ready, or may be caused by uplink/downlink transmission switching.

In another possible design, the downlink transmission of the network device has at least one time interval. This is caused by that the downlink transmission of the network device is discontinuous, for example, that the downlink transmission data or signaling of the network device is not ready.

In the foregoing two possible designs in which there is at least one time interval, when the at least one time interval is less than or equal to a preset value, the channel occupancy duration of the first terminal includes the at least one time interval; or when the at least one time interval is greater than the preset value, the channel occupancy duration of the first terminal does not include the at least one time interval. For example, the preset value may be 25 μs.

When the time interval is relatively short, the time interval has relatively small impact on transmission between the network device and the first terminal or downlink transmission of the network device. Therefore, the time interval may be ignored. When the time interval is relatively long, the time interval has relatively large impact on the transmission between the network device and the first terminal. Therefore, when necessary, the time interval is not counted in the channel occupancy duration. In other words, timing may be suspended at the time interval or time is supplemented after the channel occupancy duration ends.

In a possible design, the network device performs channel listening after the first duration ends, and performs the downlink transmission to the first terminal when a result of the channel listening is that a channel is idle. Therefore, the channel listening is performed after the first duration ends, so that a conflict caused by a change of a channel status can be avoided, to prevent downlink transmission from failing, thereby improving communication efficiency.

In a possible design, to adapt to a requirement for interaction between the network device and a plurality of terminals, for example, the network device interacts with the first terminal and a second terminal. The network device receives uplink transmission of the second terminal in channel occupancy duration of the second terminal; and after the uplink transmission of the second terminal ends, the network device performs downlink transmission in a remaining part of the channel occupancy duration of the second terminal other than the part of the channel occupancy duration used to receive the uplink transmission of the second terminal. The first terminal occupies a first bandwidth, the second terminal occupies a second bandwidth, and the first bandwidth is the same as or different from the second bandwidth.

The network device performs, in the first bandwidth, downlink transmission to the first terminal; and the network device performs, in the second bandwidth, downlink data on the second terminal.

In a possible design, the network device receives uplink transmission of a second terminal in third duration of channel occupancy duration of the second terminal, where the channel occupancy duration of the second terminal further includes fourth duration, and the fourth duration is later than the third duration; and the network device performs the downlink transmission in the fourth duration, where a sum of the third duration and the fourth duration is less than or equal to the channel occupancy duration of the second terminal.

In a possible design, the channel occupancy duration of the first terminal and the channel occupancy duration of the second terminal have a duration overlapping part, the first bandwidth and the second bandwidth have a bandwidth overlapping part, and the network device performs the downlink transmission in the bandwidth overlapping part after the duration overlapping part starts. For example, the network device performs, in the bandwidth overlapping part, the downlink transmission to at least one terminal of the first terminal and the second terminal.

In a possible design, the network device performs, in the first bandwidth, the downlink transmission to the first terminal; and the network device performs, in the second bandwidth, the downlink transmission to the second terminal. In another possible design, the network device performs, in the first bandwidth or the second bandwidth, the downlink transmission to any one of the following: the first terminal, the second terminal, or another terminal other than the first terminal and the second terminal.

In a possible design, a priority of a downlink transmission service performed by the network device in the second duration of the first terminal is not lower than a priority of an uplink transmission service performed by the first terminal in the first duration.

In a possible design, a priority of a downlink transmission service performed by the network device in the fourth duration of the second terminal is not lower than a priority of an uplink transmission service performed by the second terminal in the third duration.

In a possible design, a priority of the downlink transmission service performed by the network device in the duration overlapping part of the first terminal and the second terminal is not lower than one of a highest priority, a lowest priority, or an average priority of the uplink transmission services of the first terminal and the second terminal.

In a possible design, a priority of the downlink transmission service performed by the network device in the duration overlapping part of the plurality of terminals is not lower than one of a highest priority, a lowest priority, or an average priority of the uplink transmission services of the plurality of terminals.

According to a second aspect, this application provides a wireless communication method based on a terminal, and the method corresponds to the wireless communication method in the first aspect. The method includes: obtaining, by a terminal, channel occupancy duration, and performing uplink transmission to a network device, where a part of the channel occupancy duration is used for the uplink transmission of the terminal; and after the uplink transmission ends, receiving, by the terminal, downlink transmission from the network device in a remaining part of the channel occupancy duration other than the part of the channel occupancy duration used for the uplink transmission.

In a possible design, the terminal obtains the channel occupancy duration and performs the uplink transmission to the network device, where the channel occupancy duration includes at least first duration and second duration, the second duration is after the first duration, and the first duration is used for the uplink transmission of the first terminal; and the terminal receives, in the second duration, the downlink transmission from the network device, where a sum of the first duration and the second duration is less than or equal to channel occupancy duration of the first terminal.

In a possible design, there is at least one time interval between the first duration and the second duration.

In a possible design, when the at least one time interval is less than or equal to a preset value, the channel occupancy duration of the first terminal includes the at least one time interval; or when the at least one time interval is greater than the preset value, the channel occupancy duration of the first terminal does not include the at least one time interval. For example, the preset value may be 25 μs.

According to a third aspect, this application further provides a wireless communication method based on a network device and a plurality of terminals, including: receiving, by the network device, uplink transmission of a first terminal in first duration of channel occupancy duration of the first terminal, and receiving uplink transmission of a second terminal in third duration of channel occupancy duration of the second terminal, where the channel occupancy duration of the first terminal further includes second duration, and the second duration is later than the first duration; and the channel occupancy duration of the second terminal further includes fourth duration, and the fourth duration is later than the third duration; performing, by the network device, downlink transmission in the second duration, where a sum of the first duration and the second duration is less than or equal to the channel occupancy duration of the first terminal; and performing, by the network device, the downlink transmission in the fourth duration, where a sum of the third duration and the fourth duration is less than or equal to the channel occupancy duration of the second terminal. A start moment of the channel occupancy duration of the first terminal may be the same as or different from a start moment of the channel occupancy duration of the second terminal. The first terminal occupies a first bandwidth, the second terminal occupies a second bandwidth, and the first bandwidth is the same as or different from the second bandwidth.

According to a fourth aspect, this application provides a network device. The network device may implement the function of the network device in the foregoing method embodiment. This function may be implemented by hardware, or may be implemented by hardware by executing corresponding software. The hardware or the software includes one or more modules corresponding to the foregoing function.

In a possible design, the network device includes a processor and a transceiver connected to the processor. The processor is configured to control/use the transceiver to receive uplink transmission of a first terminal in first duration of channel occupancy duration of the first terminal, where the channel occupancy duration of the first terminal further includes second duration, and the second duration is later than the first duration; and the processor is configured to control/use the transceiver to perform downlink transmission in the second duration, where a sum of the first duration and the second duration is less than or equal to the channel occupancy duration of the first terminal.

According to a fifth aspect, this application provides a terminal. The terminal may implement the function of the network device in the foregoing method embodiments. The function may be implemented by hardware, or may be implemented by hardware executing corresponding software. The hardware or the software includes one or more modules corresponding to the foregoing function.

In a possible design, the terminal includes a processor and a transceiver connected to the processor. The processor is configured to: obtain channel occupancy duration, and control/use the transceiver to perform uplink transmission, where the channel occupancy duration includes at least first duration and second duration, and the first duration is used for the uplink transmission of the terminal; and the processor controls/uses the transceiver to receive downlink transmission from the network device at a start moment of the second duration, where a sum of the first duration and the second duration is less than or equal to the channel occupancy duration of the terminal.

According to a sixth aspect, an embodiment of this application provides a wireless communications apparatus, applied to a network device, where the wireless communications apparatus includes a processor, and the processor is configured to: be coupled to a memory, read an instruction in the memory, and perform, based on the instruction, the method according to the first aspect or the third aspect. It can be learned that, according to the wireless communications apparatus provided in the sixth aspect, the memory of the wireless communications apparatus is independent of the wireless communications apparatus.

According to a seventh aspect, an embodiment of this application provides a wireless communications apparatus, applied to a network device, where the wireless communications apparatus includes at least one processor and one memory, the memory is coupled to the at least one processor, and the at least one processor is configured to perform the method according to the first aspect or the third aspect. It can be learned that, according to the wireless communications apparatus provided in the seventh aspect, the memory of the wireless communications apparatus is integrated into the wireless communications apparatus.

According to an eighth aspect, an embodiment of this application provides a wireless communications apparatus, applied to a terminal, where the wireless communications apparatus includes a processor, and the processor is configured to: be coupled to a memory, read an instruction in the memory, and perform, based on the instruction, the method according to the second aspect. It can be learned that, according to the wireless communications apparatus provided in the eighth aspect, the memory of the wireless communications apparatus is independent of the wireless communications apparatus.

According to a ninth aspect, an embodiment of this application provides a wireless communications apparatus, applied to a terminal device, where the wireless communications apparatus includes at least one processor and one memory, the memory is coupled to the at least one processor, and the at least one processor is configured to perform the method according to the second aspect. It can be learned that, according to the wireless communications apparatus provided in the ninth aspect, the memory of the wireless communications apparatus is integrated into the wireless communications apparatus.

According to a tenth aspect, an embodiment of this application provides a computer-readable storage medium, including an instruction. When run on a computer, the instruction enables the computer to perform the method according to the first aspect to the third aspect.

According to an eleventh aspect, an embodiment of this application provides a computer program product. When run on a computer, the computer program product enables the computer to perform the method according to the first aspect to the third aspect.

It should be noted that, for technical effects of any one of the designs of the second aspect to the eleventh aspect, refer to technical effects of different designs of the first aspect. Details are not described herein again.

The aspects or other aspects in this application are more concise and easily understandable in descriptions in the following embodiments.

DESCRIPTION OF EMBODIMENTS

This application provides an uplink maximum channel occupancy time (Maximum Channel Occupancy Time, MCOT) sharing mechanism, and the uplink MCOT sharing mechanism is applicable to a flexible bandwidth scenario. The following clearly and describes the technical solutions in the embodiments of this application with reference to the accompanying drawings in the embodiments of this application. A specific operation method in a method embodiment may also be applied to an apparatus embodiment or a system embodiment.

Figure 1:
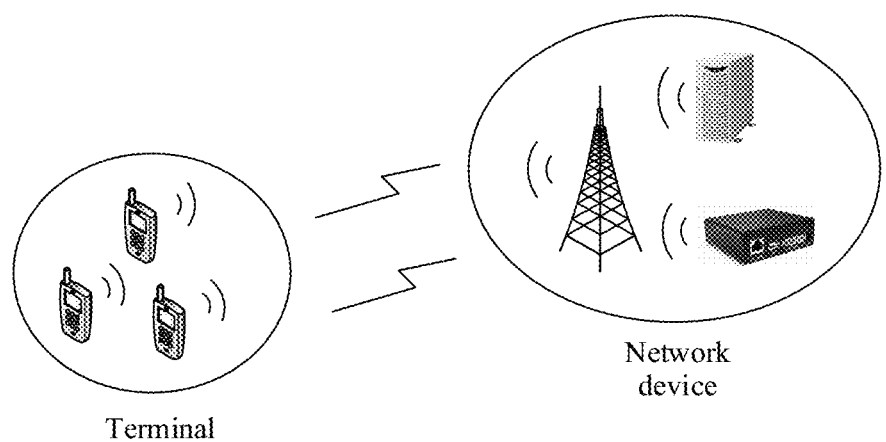
FIG. 1 is a schematic diagram of an application scenario according to an embodiment of this application.

FIG. 1 is a simplified schematic diagram of a network architecture to which an embodiment of this application is applied. The network architecture may be a network architecture of a wireless communications system. The wireless communications system may operate in a licensed frequency band or operate in an unlicensed frequency band. It may be understood that use of the unlicensed frequency band may improve a system capacity of the wireless communications system, improve channel access efficiency, improve spectrum resource utilization, and finally improve system performance.

As shown in FIG. 1, the wireless communications system may include a network device and a terminal, and the network device and the terminal are connected by using wireless communications technologies. It should be noted that quantities and forms of the terminals and network devices shown in FIG. 1 do not constitute a limitation on the embodiments of this application. In different embodiments, one wireless communications system may include one or more network devices, and one network device may be connected to one or more terminals. The network device may be further connected to a core network device, and the core network device is not shown in FIG. 1.

It should be noted that, the wireless communications system mentioned in the embodiments of this application includes, but is not limited to: a narrow band-internet of things (narrow band-internet of things, NB-IoT) system, a global system for mobile communications (global system for mobile communications, GSM), an enhanced data rate for GSM evolution (enhanced data rate for GSM evolution, EDGE) system, a wideband code division multiple access (wideband code division multiple access, WCDMA) system, a code division multiple access 2000 (code division multiple access, CDMA2000) system, a time division-synchronization code division multiple access (time division-synchronization code division multiple access, TD-SCDMA) system, a long term evolution (long term evolution, LTE) system, a fifth-generation mobile communications system, and a future mobile communications system.

In the embodiments of this application, the network device is an apparatus that is deployed in a radio access network and that provides a wireless communication function for a terminal. The network device may include but is not limited to a base station (Base Station, BS), a station (Station, STA, including an access point (Access Point, AP) and a non-AP station STA), a network controller, a transmission and reception point (transmission and reception point, TRP), a mobile switching center, a wireless access point in Wi-Fi, or the like. For example, an apparatus that directly communicates with the terminal by using a radio channel is usually a base station. The base station may include a macro base station, a micro base station, a relay station, an access point, a remote radio unit (Remote Radio Unit, RRU), or the like in various forms. Certainly, the terminal may alternatively perform wireless communication with another network device having a wireless communication function. This is not uniquely limited in this application. It should be noted that, in different systems, names of devices having a base station function may be different. For example, in an LTE network, the device is referred to as an evolved NodeB (evolved NodeB, eNB or eNodeB); in the 3rd generation (the 3rd Generation, 3G) network, the device is referred to as a NodeB (NodeB) or the like; and in a 5G network, the device is referred to as a 5G base station (NR NodeB, gNB).

A terminal, also referred to as a terminal device, may include, for example, user equipment (user equipment, UE), a mobile station (mobile station, MS), a mobile terminal (mobile terminal, MT), or the like. The terminal is a device that provides a user with voice and/or data connection communication, for example, a handheld device with a wireless connection function, a vehicle-mounted device, a wearable device, a computing device, or another processing device connected to a wireless modem. Currently, some examples of terminals are: a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), and a wireless terminal in a smart home (smart home).

In this application, nouns "network" and "system" may be alternately used, and nouns "user" and "terminal" may be alternatively used. However, a person skilled in the art may understand meanings of the nouns. In addition, some English abbreviations in this specification are used to describe the embodiments of this application by using the LTE system as an example. The English abbreviations may change with network evolution. For specific evolution, refer to descriptions in a corresponding standard.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, the terms "first", "second", "third", "fourth" and so on are intended to distinguish between different objects but do not indicate a particular order. In addition, the terms "including", "having", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In this application, the noun "sender" is a party that initiates transmission, or may be a party that sends a signal. In different embodiments, the sender may be a network device, or may be a terminal. That is, the signal may be a downlink signal, or may be an uplink signal. The signal includes data and/or signaling.

In the unlicensed frequency band, a sender that needs to send data or signaling usually needs to use or share a radio resource in a contention manner. This procedure may be referred to as a channel access procedure (channel access procedure). In some embodiments, an LBT mechanism may be used in the contention manner. Specifically, before sending a signal or data, the network device or the terminal listens to (listen to) or senses (sense) a channel in the unlicensed frequency band, to determine whether the channel is idle or busy. If the channel is idle, the network device or the terminal performs transmission. If the channel is busy, the network device or the terminal does not perform transmission. In some examples, the sender may determine, based on receive power of a channel in the unlicensed frequency band, whether a corresponding channel is idle or busy. The mechanism may be referred to as clear channel assessment (clear channel assessment, CCA). If the receive power is less than a preset threshold, the channel is in an idle state; or if the receive power is not less than the preset threshold, the channel is in a busy state.

In different embodiments, the LBT mechanism may include at least two types. The first type is an LBT mechanism based on random backoff, and the second type is an LBT mechanism in which random backoff is not performed. The following separately describes the two types of LBT mechanisms in more detail.

First, a type 1 LBT (Type 1 LBT) is described. In some cases, the type may also be referred to as a type 4 (Cat 4) LBT. The sender listens to a state of a channel in a time period. When detecting that the channel is idle in the time period, the sender selects a random backoff number to perform backoff before access. For example, a backoff slot T_sl is used as a granularity in the backoff process (for example, T_sl=9 µs, and a size of the backoff slot is not limited in this application). After selecting the random backoff number N, if N=0, the sender ends the random backoff process and accesses the channel. If N>0, it is assumed that N=N-1 and the channel is listened to in one backoff slot T_sl. If the channel is idle, the process is repeated until N=0. If the channel is occupied, the sender needs to listen in an additional time period, and after detecting that the channel is idle, the backoff process is continued until N=0, and then the channel is accessed. After the backoff ends, the channel is accessed, and a channel occupancy time is obtained. The occupancy time may also be referred to as a maximum channel occupancy time (maximum channel occupancy time, MCOT). The sender allows continuous transmission in the channel occupancy time. In different embodiments, duration of the MCOT may be 2 ms, 4 ms, 6 ms, 10 ms, or the like, or may be another time unit. It should be noted that, in the Wi-Fi system, the sender obtains a transmit opportunity (transmit opportunity, TXOP), where the transmit opportunity may include specific occupation duration. In some embodiments, after successfully obtaining a corresponding channel occupancy time, the sender may license the channel to another device in communication with the sender. In other words, after obtaining the MCOT by using the LBT, the sender may share the MCOT with another device in communication with the sender.

Next, a Type 2 LBT (Type 2 LBT) is described. In some cases, the type may also be referred to as a type 2 (Cat 2) LBT. The sender listens to a state of a channel in a fixed time period (for example, 25 microseconds (µs)). When detecting that the channel in the fixed time period is idle, the sender may access the channel for transmission. When detecting that the channel in the fixed time period is busy, the sender waits for a next listening opportunity or abandons listening. Because the backoff is not required, compared with the Type 1 LBT, the Type 2 LBT may access the channel more quickly.

Figure 2:
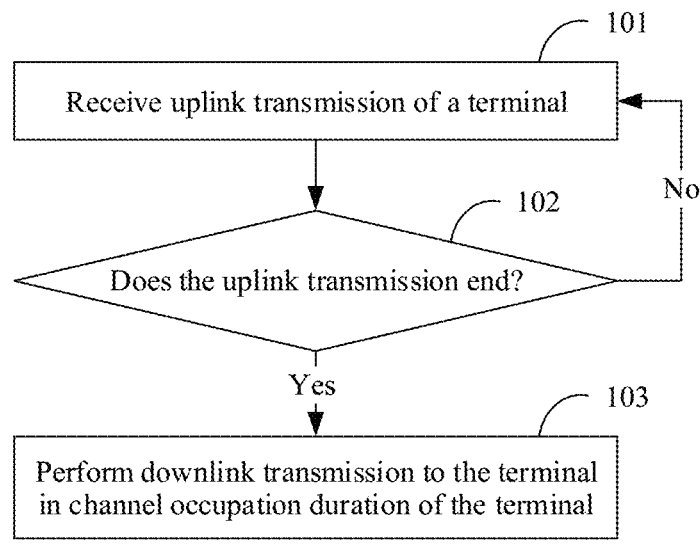
FIG. 2 is a schematic flowchart of a wireless communication method applied to a network device according to an embodiment of this application.

FIG. 2 shows a wireless communication method 100 according to an embodiment of this application. The method 100 is performed by a network device. It should be noted that the network device may interact with one terminal, or may interact with a plurality of terminals. The wireless communication method 100 includes the following steps.

101. The network device receives uplink transmission of a first terminal in first channel occupancy duration of the first terminal.

The uplink transmission may be carrying data or signaling, including but not limited to a physical uplink shared channel (physical uplink shared channel, PUSCH) and a physical uplink control channel (physical uplink control channel, PUCCH). In other words, the uplink transmission may be transmission of uplink signaling, for example, the PUCCH; or may be transmission of uplink data, for example, the PUSCH; or may be a combination of the uplink signaling and the uplink data. For ease of representation, duration in which the first terminal performs the uplink transmission is referred to as "first duration" herein. In other words, the network device receives the uplink transmission of the first terminal in the first duration of the first channel occupancy duration of the first terminal.

In an embodiment, the network device may learn of information such as the channel occupancy duration and uplink transmission duration of the first terminal by itself. Specifically, the network device is responsible for maintaining related parameters of channel resource contention, uplink transmission, and the like that are performed by the first terminal, for example, how the first terminal operating in an unlicensed frequency band performs the channel resource contention, and duration of the uplink transmission performed after the first terminal accesses the channel. The network device schedules the terminal based on the foregoing parameters. In this embodiment, LBT is used as an example for description. The network device maintains an LBT-related parameter of the first terminal, for example, one or more of a used LBT type, a channel access priority, a contention window size, a random backoff number, and other parameters. The network device further maintains a related parameter of the uplink transmission of the first terminal device, for example, when to start the uplink transmission, and duration required for the uplink transmission. Because the uplink transmission is based on the scheduling performed by the network device, the network device may learn of an MCOT occupation status of the first terminal. For example, a time at which the first terminal performs the uplink transmission and a length of data to be sent are scheduled by the network device. It can be learned that the network device may learn of a start time and an end time of the uplink transmission of the first terminal, and may also learn of a remaining time in a corresponding MCOT other than time used for the uplink transmission.

In another embodiment, the first terminal uses a grant-free transmission (UL transmission without dynamic grant/scheduling) manner. The grant-free transmission may be a method for implementing uplink data transmission of the first terminal without dynamic scheduling by the network device. The dynamic scheduling may be a scheduling manner in which the network device indicates, by using signaling, a transmission resource for each uplink transmission of the first terminal. The method is similar to the manner in the foregoing embodiment. In this case, when performing the uplink transmission, the first terminal may send, to the network device, information such as the channel occupancy duration and the uplink transmission duration that are obtained by the first terminal, so that the network device knows when to start downlink transmission. The network device may configure a transmission resource and/or parameter for the grant-free transmission in two resource configuration manners. Manner 1: The resource and/or the parameter are/is configured by using higher layer signaling. For example, the higher layer signaling may be radio resource control (radio resource control, RRC) signaling. Manner 2: The resource and/or the parameter are/is configured by using the higher layer signaling and physical layer signaling. For example, the physical layer signaling may be layer L1 signaling (L1 signaling). In Manner 2, after the higher layer signaling is received, the physical layer signaling further needs to be received. In this way, configurations in the higher layer signaling and the physical layer signaling can be applied to the grant-free transmission. For a more specific implementation, refer to the following description of 201 in the embodiment shown in FIG. 4, in which the terminal performs the grant-free transmission.

102. The network device determines whether the uplink transmission ends. When determining that the uplink transmission ends, the network device performs 103. When determining that the uplink transmission does not end, the network device performs 101. 102 is not a mandatory step. In another embodiment, because the network device knows an end moment of the uplink transmission of the first terminal, 103 may be directly performed after 101.

103. The network device performs the downlink transmission in a remaining part of the channel occupancy duration of the first terminal other than the part of the channel occupancy duration used for the uplink transmission.

After the uplink transmission of the first terminal ends, if there is remaining first channel occupancy duration, the network device starts the downlink transmission in the remaining part. In different implementations, the network device may directly perform transmission without performing the LBT before starting the downlink transmission. Alternatively, the network device may perform the LBT before starting the downlink transmission, and start the downlink transmission when a result of the LBT is that a channel is idle. The downlink transmission may carry, including but not limited to a physical downlink shared channel (physical downlink shared channel, PDSCH), a physical downlink control channel (physical downlink control channel, PDCCH), and the like. In other words, the downlink transmission may be transmission of downlink control signaling, for example, the PDCCH; or may be transmission of downlink data, for example, the PDSCH; or may be a combination of the downlink control signaling and the downlink data. For ease of representation, duration in which the network device performs the downlink transmission in remaining duration of the first channel occupancy duration is defined as "second duration". In other words, the network device performs the downlink transmission in the second duration, and the second duration is later than the first duration.

It may be understood that, based on a size of a resource that needs to be transmitted by the network device, the network device may use up a remaining MCOT resource, or may not use up the remaining MCOT resource. This is not limited in this application. In other words, in different embodiments, a sum of the first duration and the second duration may be less than or equal to the channel occupancy duration of the first terminal. To be specific, for the channel occupancy duration of the first terminal, a sum of the duration of the uplink transmission performed by the first terminal and the duration of the downlink transmission performed by the network device does not need to completely use up the channel occupancy duration.

Figure 3:
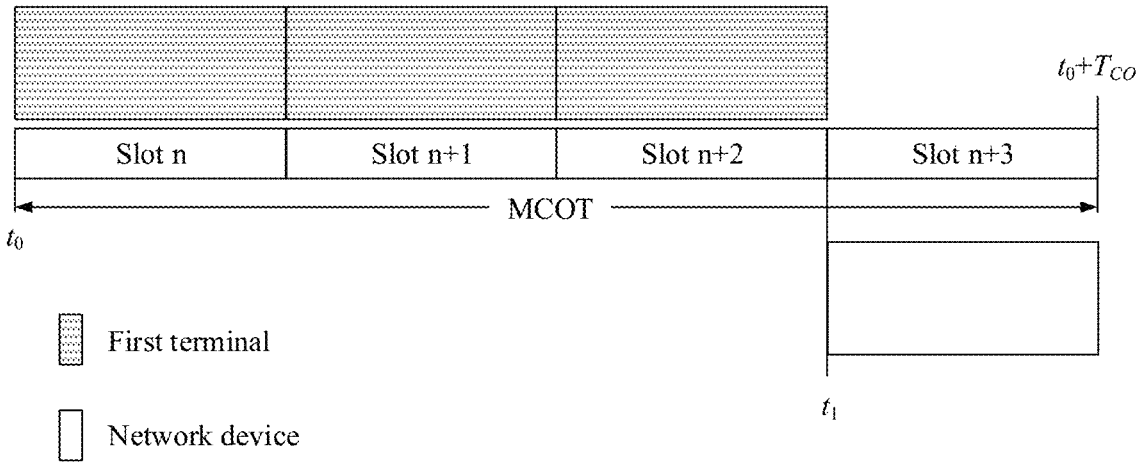
FIG. 3 is a schematic diagram of an MCOT of a terminal according to an embodiment of this application.

A time unit for scheduling the first terminal by the network device may be a slot (slot), a mini slot (mini slot), a subframe (subframe), a frame (frame), a transmission time interval (transmission time interval, TTI), or the like. Referring to FIG. 3, an example in which a network device schedules a first terminal to perform Type 1 LBT is used. In this embodiment, an example in which a time unit for scheduling is a slot of which duration is 1 ms is used. When successfully preempting a channel, the first terminal obtains a first channel occupancy duration MCOT, and duration of the MCOT is 4 ms, corresponding to four slots. It may be understood that in another implementation, a length of the slot may be dynamically adjusted. The length of the slot is not limited in this application. For ease of description, $t_0$ is used to represent a start moment of the MCOT, $t_1$ is used to represent an end moment of uplink transmission of the terminal device, and $t_0+T_{CO}$ is used to represent an end moment of the MCOT.

When the network device receives the uplink transmission of the first terminal at the moment $t_0$, it means that the first terminal successfully preempts the channel and obtains a corresponding MCOT. Because how the first terminal performs the LBT is scheduled by the network device, the network device may learn of the MCOT obtained by the first terminal and the duration occupied by the uplink transmission. As shown in the figure, the MCOT occupies four slots: n to n+3, the duration of the uplink transmission of the first terminal are three slots: n to n+2, and a remaining part of the MCOT other than time used for the uplink transmission is one slot: n+3. In this embodiment, the network device receives the uplink transmission from the terminal in a part (that is, $t_0$ to $t_1$) of the first channel occupancy duration of the first terminal, and performs downlink transmission to the first terminal in remaining duration (that is, $t_1$ to $t_0+T_{CO}$) of the first channel occupancy duration. In other words, the first duration is three slots, and the second duration is one slot.

Figure 4:
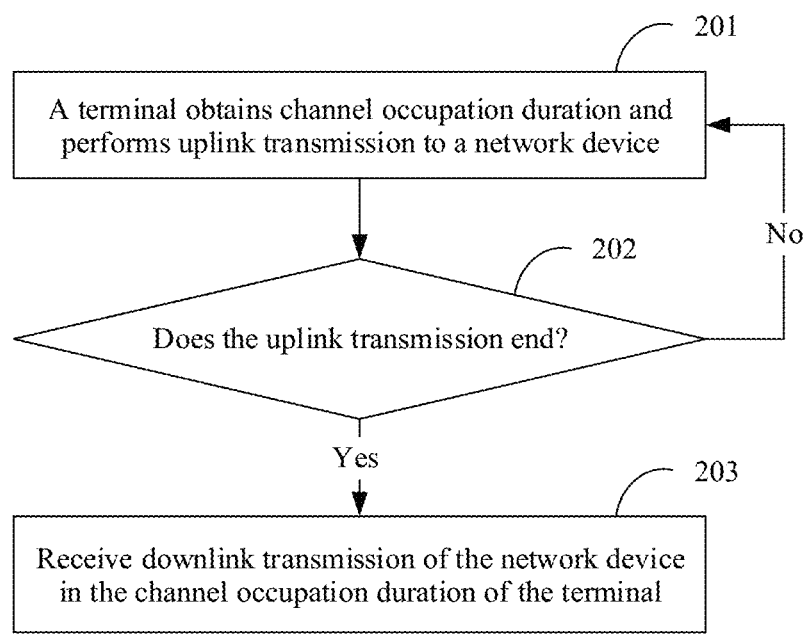
FIG. 4 is a schematic flowchart of a wireless communication method applied to a terminal according to another embodiment of this application.

FIG. 4 shows a wireless communication method 200 according to another embodiment of this application. The method 200 is performed by a terminal. The wireless communication method 200 includes the following steps.

201. The terminal obtains channel occupancy duration and performs uplink transmission to a network device, where the uplink transmission of the terminal occupies only a part of the channel occupancy duration.

In a possible embodiment, the terminal is scheduled by the network device. Therefore, the network device may learn of information such as the channel occupancy duration and the uplink transmission duration of the terminal by itself. Therefore, the terminal does not need to report related information to the network device. For a more specific implementation, refer to the foregoing description of 101 in FIG. 2, in which the network device dynamically schedules the terminal.

In another possible embodiment, the terminal performs grant-free transmission. In this case, the terminal maintains related parameters of channel resource contention, the uplink transmission, and the like. In this embodiment, LBT is used as an example for description. The terminal maintains one or more of parameters such as an LBT type, a channel access priority, a contention window, and a random backoff number. The terminal performs the LBT before uplink transmission, and obtains a corresponding MCOT after the LBT succeeds. In this case, the terminal needs to report a use status of the MCOT to the network device during the uplink transmission. More specifically, the terminal may add one or more of the following parameters: MCOT duration, uplink transmission duration, remaining available MCOT duration, and the like to the uplink transmission to notify the network device. For example, the duration parameters may be reported based on a time granularity, for example, a frame, a subframe, a slot, or a mini slot. Alternatively, the remaining part of the MCOT that may be used for the downlink transmission may be reported based on an absolute time, for example, in a unit of millisecond (ms) or microsecond (μs). For example, the parameters may be carried in uplink control signaling such as a PUCCH or carried in uplink data of a PUSCH for transmission. Specifically, the parameters may be carried in a newly added field (for example, the field may be named as remaining MCOT) of the PUCCH for transmission; or the parameters may be transmitted by reusing an existing field (for example, channel state information (channel state information, CSI)) of the PUCCH. In addition, optionally, in a flexible bandwidth scenario, because a bandwidth corresponding to the terminal is dynamic, the terminal further needs to notify the network device of a bandwidth of the terminal device during the uplink transmission. Therefore, the network device may select, based on the MCOT use status reported by the first terminal, to perform the downlink transmission in the remaining MCOT.

202. The terminal determines whether the uplink transmission ends. When the uplink transmission ends, the terminal performs 203. When the uplink transmission does not end, the terminal performs 201. 202 is not a mandatory step. In another embodiment, because the terminal knows an end moment of uplink transmission of the terminal, 203 may be directly performed after 202.

203. The terminal receives downlink transmission from the network device in a remaining part of the channel occupancy duration other than the part of the channel occupancy duration used for the uplink transmission.

In a possible implementation, for the MCOT obtained by the terminal using the grant-free transmission manner, the network device may dynamically schedule another terminal by using the resource. The network device has configured (for example, in a manner of sending a trigger A) that the terminal needs to perform the uplink transmission, and correspondingly indicates the scheduling resource. However, signaling (for example, a trigger B) still needs to be used to trigger the terminal to perform the uplink transmission to the resource indicated by the trigger A. In this case, the network device may send the trigger B in second duration. If a remaining MCOT still exists in this case, a corresponding terminal may quickly access the channel by using the type 2 LBT for the uplink transmission. In another implementation, if a time interval between a moment at which the network device sends the trigger B and a start moment at which the terminal performs the uplink transmission is less than a threshold, the terminal corresponding to the trigger B directly accesses the channel without performing the LBT.

In the embodiment shown in FIG. 3, when the first terminal completes the uplink transmission, the network device starts to perform the downlink transmission. In other words, there is no interval between the uplink transmission of the first terminal (that is, the first duration) and the downlink transmission of the network device (that is, the second duration). Alternatively, an interval between the uplink transmission of the first terminal and the downlink transmission of the network device so short that can be ignored. However, in another embodiment, due to scheduling, there is a case in which the uplink transmission of the terminal is completed but the downlink transmission of the network device is not ready. Consequently, after the uplink transmission of the terminal is completed, the network device cannot immediately perform the downlink transmission. In other words, there may be an interval between the uplink transmission of the first terminal and the downlink transmission of the network device (for ease of description, the interval is represented by "$T_{g1}$"). In the interval $T_{g1}$ between the two, an idle state of the channel may change, for example, the channel is preempted by another device and enters a busy state. In this case, if the network device performs the downlink transmission in the remaining part of the MCOT of the terminal, a conflict may occur between the network device and the device that has preempted the channel, and as a result, the downlink transmission fails.

Figure 5:
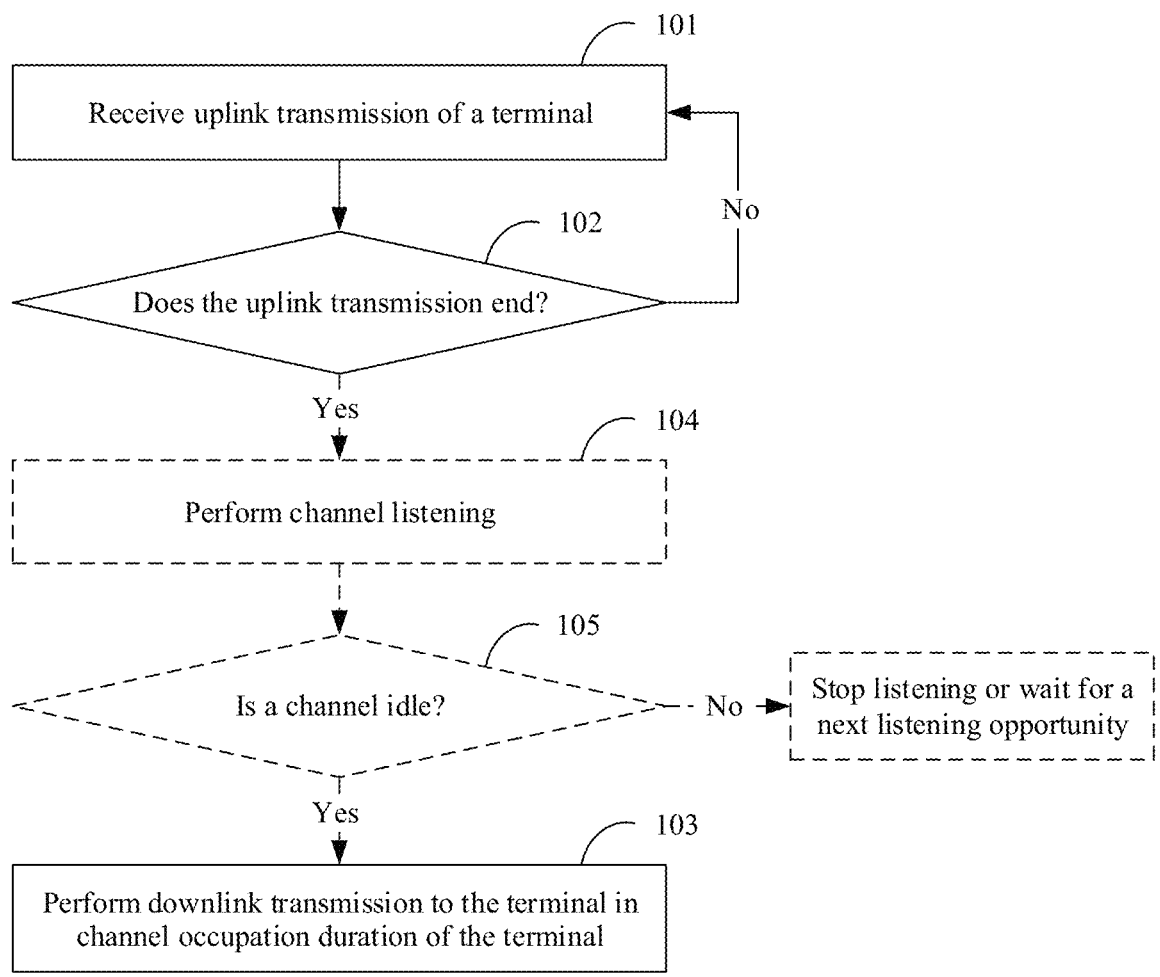
FIG. 5 is a schematic flowchart of a wireless communication method applied to a network device according to another embodiment of this application.

Referring to FIG. 5, to resolve the downlink transmission failure problem, in another possible embodiment of this application, in the wireless communication method 200 shown in FIG. 2, after 102, the method may further include the following steps.

104. The network device performs channel listening. Specifically, the network device may perform the channel listening on a channel corresponding to the terminal.

In this embodiment, the network device may start the channel listening at the end moment of the uplink transmission. In this case, the channel listening falls within the MCOT of the terminal. Therefore, the network device may access the channel in a faster manner, for example, by using the Type 2 LBT, and the network device needs to listen to a state of the channel in a time period (for example, 25 μs).

105. Determine whether a result of the channel listening is idle. When detecting that the channel is idle, the network device performs 103. When detecting that the channel is busy, the network device stops listening or waits for a next listening opportunity. For example, the next listening opportunity may be at a start moment of a next time unit (for example, a slot), that is, channel listening is performed in a next slot of the current slot.

Figure 6:
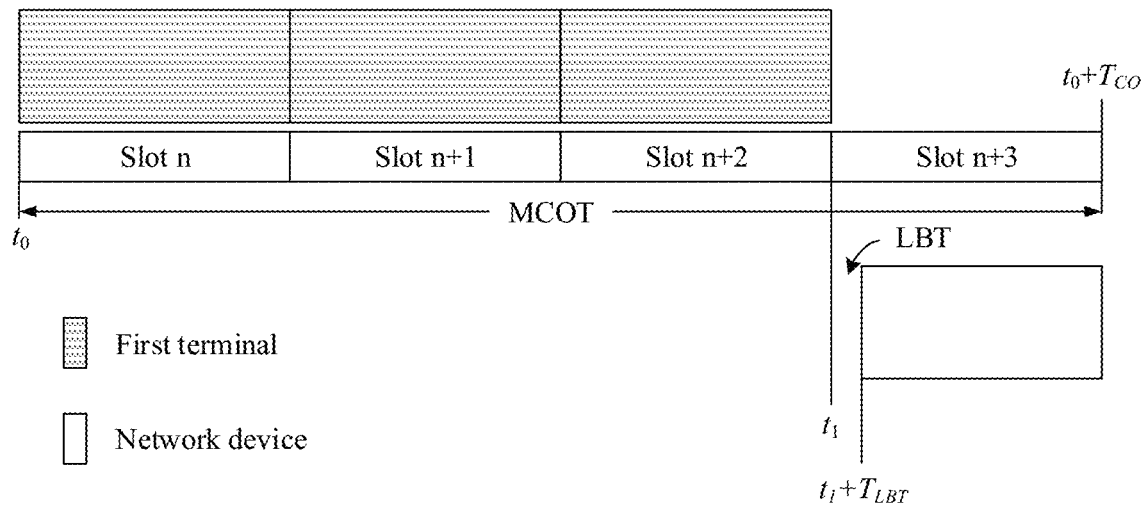
FIG. 6 is a schematic diagram of an MCOT when a network device performs LBT according to an embodiment shown in FIG. 5 of this application.

The network device starts the LBT after the uplink transmission of the first terminal ends, for example, may start the LBT from $t_1$, or may start the LBT at a moment after a period of time after $t_1$. Referring to FIG. 6, the LBT starting from $t_1$ is further described. "$T_{LBT}$" is used to represent the LBT duration. When determining that the channel is idle, the network device starts to perform the downlink transmission at a moment $t_1 + T_{LBT}$. For example, when $T_{LBT} = 25$ μs, the network device starts the LBT at $t_1$ and continuously listens for 25 μs, to determine the state of the channel in 25 μs. If the channel listened to is idle until next 25 μs, the downlink transmission may start at a moment $t_1 + 25$ μs. It can be learned that in the embodiment shown in FIG. 6, $T_{g1} = T_{LBT} = 25$ μs.

Persons of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In the embodiment shown in FIG. 6, the end moment $t_1$ of the uplink transmission of the first terminal is an end moment of the last symbol in the slot n+2. In another embodiment, the network device may configure last one or more symbols of the last slot of the uplink transmission of the first terminal as empty. For example, the network device configures the last symbol of the first terminal in the slot n+2 as null. In this case, the uplink transmission moment $t_1$ of the first terminal is an end moment of a penultimate symbol in the slot n+2. Therefore, the network device may start the LBT at the end moment of the penultimate symbol in the slot n+2.

In still another embodiment, the network device may further configure a timing advance (timing advance, TA) for the uplink transmission of the first terminal, so that the uplink transmission of the first terminal is advanced. For example, the network device may configure the TA of the first terminal as one symbol. In this case, the uplink transmission moment $t_1$ of the first terminal is the end moment of the penultimate symbol in the slot n+2. Therefore, the network device may start the LBT at the end moment of the penultimate symbol in the slot n+2.

It can be learned that after the uplink transmission of the terminal ends, the network device performs the LBT before starting the downlink transmission, to avoid the downlink transmission failure caused by a change in the idle state of the channel because there is a specific interval between the uplink transmission of the terminal and the downlink transmission of the network device.

In another embodiment, the network device may alternatively perform the LBT before the uplink transmission of the terminal ends. In other words, the network device may start the LBT before the moment $t_1$. For example, if the last one or more symbols (symbol) of the uplink transmission of the terminal are idle, the last one or more symbols (symbol) may be used for the LBT. Therefore, when content required for the downlink transmission by the network device is ready, the network device may perform the transmission when the LBT is completed.

In some scenarios, when duration of the interval $T_{g1}$ between the uplink transmission of the terminal and the downlink transmission of the network device is relatively short, a probability that the channel is preempted by another device is relatively low. To ensure communication efficiency, even if there is the interval $T_{g1}$ at the moment, the network device may not perform the LBT before starting the downlink transmission. In some embodiments, the network device may set preset duration $T_{mix}$. When there is a time interval between the uplink transmission of the terminal and the downlink transmission of the network device, but the time interval is less than or equal to the preset duration $T_{mix}$, the network device may directly start the downlink transmission without performing the LBT. For example, the predetermined duration $T_{mix}$ may be 16 μs. In the embodiment shown in FIG. 7, the interval $T_{g1}$ between the uplink transmission of the terminal and downlink transmission of the network device is equal to 16 μs and is equal to $T_{mix}$, and the network device may start the downlink transmission at a moment $t_1$+16 μs without performing the LBT.

In some other embodiments, the network device performs a plurality of downlink transmissions, and there is a time interval (which is represented by "$T_{g2}$" for ease of description) between the plurality of downlink transmissions. In other words, the downlink transmission of the network device is discontinuous. For whether the network device needs to perform the LBT before the plurality of downlink transmissions, refer to the preset duration $T_{mix}$ set by the network device. When the time interval $T_{g2}$ between two downlink transmissions is less than (or equal to) the preset duration $T_{mix}$, the LBT may not be performed before the network device performs the latter downlink transmission. When the time interval $T_{g2}$ between the two downlink transmissions is greater than (or equal to) the preset duration $T_{mix}$, the network device performs the LBT before the latter downlink transmission.

It should be noted that, for an MCOT of a terminal, there may be at least one time interval $T_{g1}$ and at least one time interval $T_{g2}$, and the time intervals $T_{g1}$ and $T_{g2}$ may be counted in the MCOT, or may not be counted in the MCOT. When the at least one time interval $T_{g1}$ or the at least one time interval $T_{g2}$ is less than (or equal to) the preset value, the channel occupancy duration of the first terminal includes the at least one time interval. In other words, the time interval is counted in the MCOT. When the at least one time interval $T_{g1}$ or the at least one time interval $T_{g2}$ is greater than (or equal to) the preset value, the channel occupancy duration of the first terminal does not include the time interval. In other words, the time interval is not counted in the MCOT. For example, the preset value may be 25 μs.

For clearer description by using an example, $T_g$ is used in the following to represent a sum of time intervals. When the interval $T_g$ is counted in the MCOT, $T_{CO}=T_{MCOT}$. When the interval is not counted in the MCOT, $T_{CO}=T_{MCOT}+T_g$. When there is no time interval $T_{g1}$ between the downlink transmission of the network device and the uplink transmission of the terminal, $T_g=T_{g2}$. When the downlink transmission of the network device is continuous, that is, there are no plurality of downlink transmissions, $T_g=T_{g1}$. When the time interval $T_{g1}$ exists between the downlink transmission of the network device and the uplink transmission of the terminal, and the time interval exists on the downlink transmission of the network device, $T_g=T_{g1}+T_{g2}$.

In different embodiments, the at least one time interval $T_{g1}$ and the at least one time interval $T_{g2}$ may also be separately considered whether to be counted in the MCOT. For example, only the time interval $T_{g1}$ is considered. When the at least one time interval $T_{g1}$ between the downlink transmission of the network device and the uplink transmission of the terminal is greater than the preset value, the at least one time interval $T_{g1}$ is not counted in the MCOT. However, regardless of whether there is a time interval for the downlink transmission of the network device or the existing at least one time interval $T_{g2}$ that exists is greater than (or equal to) the preset value, the time interval $T_{g1}$ is counted in the MCOT. For another example, only the time interval $T_{g2}$ is considered. When there is the time interval for the downlink transmission or the existing at least one time interval $T_{g2}$ is greater than (or equal to) the preset value, the at least one time interval $T_{g2}$ is not counted in the MCOT. However, regardless of whether the at least one time interval $T_{g1}$ between the downlink transmission of the network device and the uplink transmission of the terminal is greater than (or equal to) the preset value, the time interval $T_{g2}$ is counted in the MCOT.

In different embodiments, different rules may be set for the time interval ($T_{g1}$ or $T_{g2}$) to determine whether the time interval is counted in the MCOT. For example, the preset value may be 25 μs. When the time interval is greater than 25 μs, the time interval is not counted in the MCOT; or when the time interval is less than or equal to 25 μs, the time interval is counted in the MCOT. Alternatively, when the time interval is greater than or equal to 25 μs, the time interval is not counted in the MCOT; or when the time interval is less than 25 μs, the time interval is counted in MCOT. Alternatively, when the time interval is greater than 25 μs, the time interval is counted in the MCOT; or when the time interval is less than or equal to 25 μs, the time interval is not counted in the MCOT. Alternatively, when the time interval is greater than or equal to 25 μs, the time interval is counted in the MCOT; or when the time interval is less than 25 μs, the time interval is not counted in the MCOT.

Figure 7:
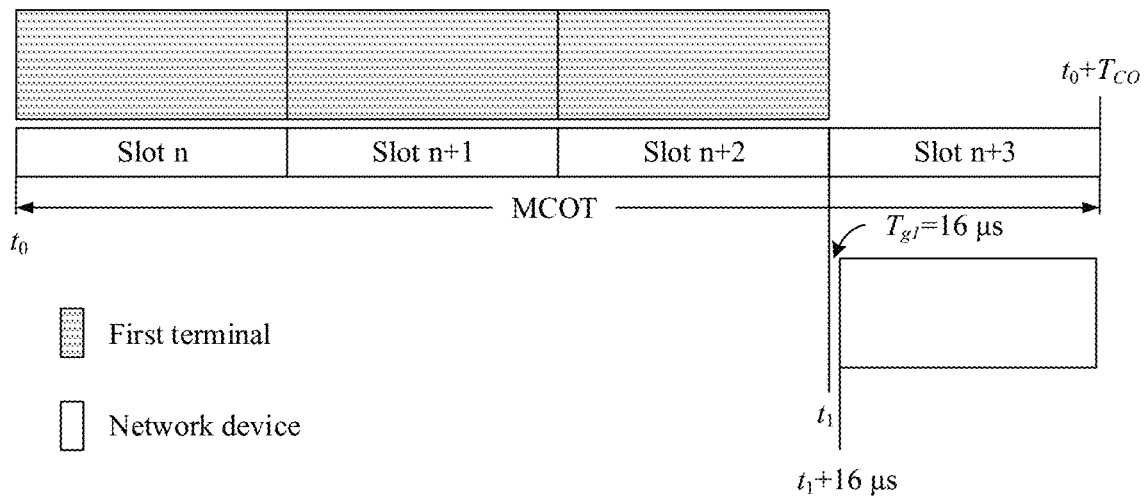
FIG. 7 is a schematic diagram of an MCOT in which there is a time interval between downlink transmission of a network device and uplink transmission of a terminal according to an embodiment of this application.
Figure 8:
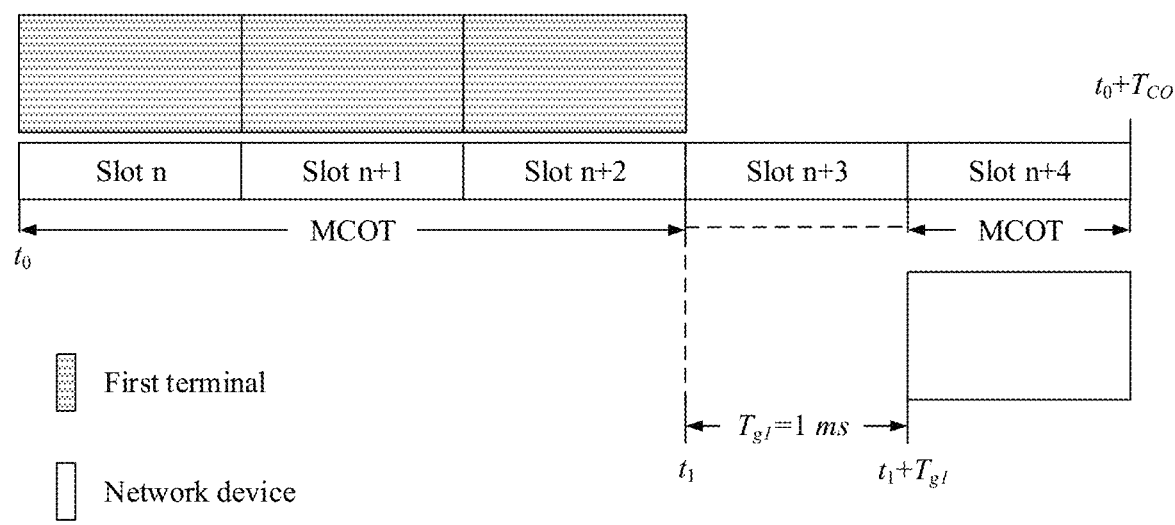
FIG. 8 is a schematic diagram of an MCOT in which there is a time interval between downlink transmission of a network device and uplink transmission of a terminal according to another embodiment of this application.

The following provides descriptions with reference to the accompanying drawings by using an example in which when $T_{g1}$ is greater than 25 μs, $T_{g1}$ is not counted in the MCOT; or when $T_{g1}$ is less than or equal to 25 μs, $T_{g1}$ is counted in the MCOT. "$T_{MCOT}$" is used to indicate the MCOT duration obtained by the terminal. Referring to FIG. 3, $T_{g1}=0\leq 25$ μs, $T_{g1}$ is counted in the MCOT, and $T_{CO}=T_{MCOT}$. Referring to FIG. 7, $T_{g1}=16$ μs, and $T_{g1}$ is counted in MCOT, and $T_{CO}=T_{MCOT}$. Because of a time interval, actual available duration in this case is less than the duration of the MCOT. Referring to FIG. 8, $T_{g1}=1$ ms>25 μs, $T_{g1}$ is not counted in the MCOT, and $T_{CO}=T_{MCOT}+T_{g1}$. This is equivalent to that the part occupied by the time interval is supplemented. In this case, the actual available duration is equal to the duration of the MCOT.

The foregoing describes a scenario of one terminal, and there may be a plurality of terminals in the system. In addition, in a flexible bandwidth scenario, bandwidths occupied by the plurality of terminals may be different. In the following, two terminals (which are represented by "terminal 1" and "terminal 2" in the following) with different bandwidths are used as an example for related description. In another embodiment, bandwidths occupied by the two terminals may alternatively be the same. This is not limited in this application.

Figure 9:
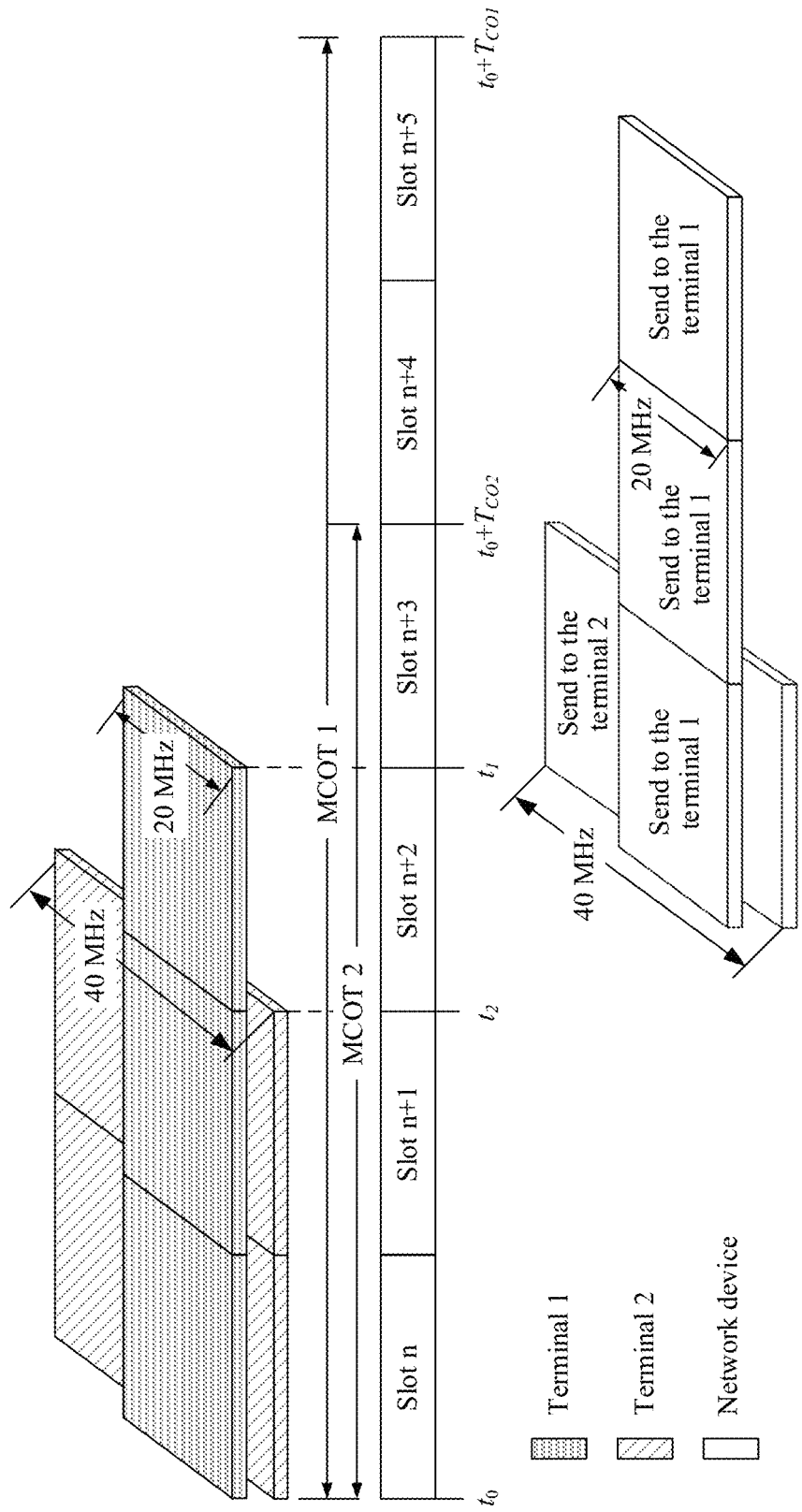
FIG. 9 is a schematic diagram of MCOTs of two terminals according to another embodiment of this application.

Referring to FIG. 9, the terminal 1 with a bandwidth of 20 MHz and the terminal 2 with a bandwidth of 40 MHz are used as an example. In the following, "first bandwidth" is used to represent the bandwidth of the terminal 1, and "second bandwidth" is used to represent the bandwidth of the terminal 2. The terminal 1 determines, in the 20 MHz bandwidth by using the LBT, that the channel is idle, accesses the channel at $t_0$, and obtains first channel occupancy duration MCOT1 ($t_0$ to $t_0+T_{CO1}$). Duration of the MCOT1 is 6 ms. The terminal 1 completes uplink transmission at $t_1$. In other words, the terminal 1 performs the uplink transmission in first duration $t_0$ to $t_1$, and the network device may start downlink transmission at least in second duration $t_1$ to $t_0+T_{CO1}$ in the MCOT1. The terminal 2 determines, in the 40 MHz bandwidth by using the LBT, that the channel is idle, accesses the channel at to, and obtains second channel occupancy duration MCOT2 ($t_0$ to $t_0+T_{CO2}$). Duration of the MCOT2 is 4 ms. The terminal 2 completes the uplink transmission at $t_2$. In other words, the terminal 2 performs the uplink transmission in third duration $t_0$ to $t_2$, and the network device may start the downlink transmission in fourth duration $t_2$ to $t_0+T_{CO2}$ in the MCOT2.

It can be learned that when the plurality of terminals access a channel to perform the uplink transmission, the network device may start the downlink transmission in a plurality of periods of duration. In some embodiments, the network device may separately start the downlink transmission in the plurality of periods of duration, to separately send the downlink transmission to terminals corresponding to the duration. Start time of the downlink transmission for different terminals may be the same or may be different. In another possible embodiment, the network device may select, based on a preset rule, at least one of a plurality of MCOTs (or a plurality of periods of duration) to start the downlink transmission, and the selected MCOT (or duration) may be used to perform the downlink transmission to a terminal corresponding to the selected MCOT (or duration); or may be used to perform the downlink transmission to another terminal scheduled by the network device. For example, the preset rule may be: selecting a longest or shortest MCOT (or duration). Alternatively, the preset rule may be: selecting an average value of access bandwidths of at least one terminal, and performing the downlink transmission to one terminal in the selected MCOT.

For example, for the plurality of terminals, the network device may maintain the plurality of periods of MCOT duration. More specifically, a base station may set a timer for each terminal. A length of the timer is a length of the MCOT or the uplink transmission. In other words, the base station needs to maintain a plurality of timers. Certainly, in another implementation, the network device may alternatively maintain the plurality of MCOTs by using another method.

For the MCOTs of the plurality of terminals, the network device may separately perform the downlink transmission to the plurality of terminals, and select one MCOT to perform the downlink transmission to the plurality of terminals and/or another terminal scheduled by the network device other than the plurality of terminals, so that an MCOT resource of the terminal can be more effectively used.

For example, in a possible design, the network device performs, in the first bandwidth, the downlink transmission to the terminal 1; and the network device performs, in the second bandwidth, the downlink transmission to the terminal 2. In another possible design, the network device performs, in the first bandwidth or the second bandwidth, the downlink transmission to any one of the following: the terminal 1, the terminal 2, or another terminal other than the terminal 1 or the terminal 2.

Figure 10:
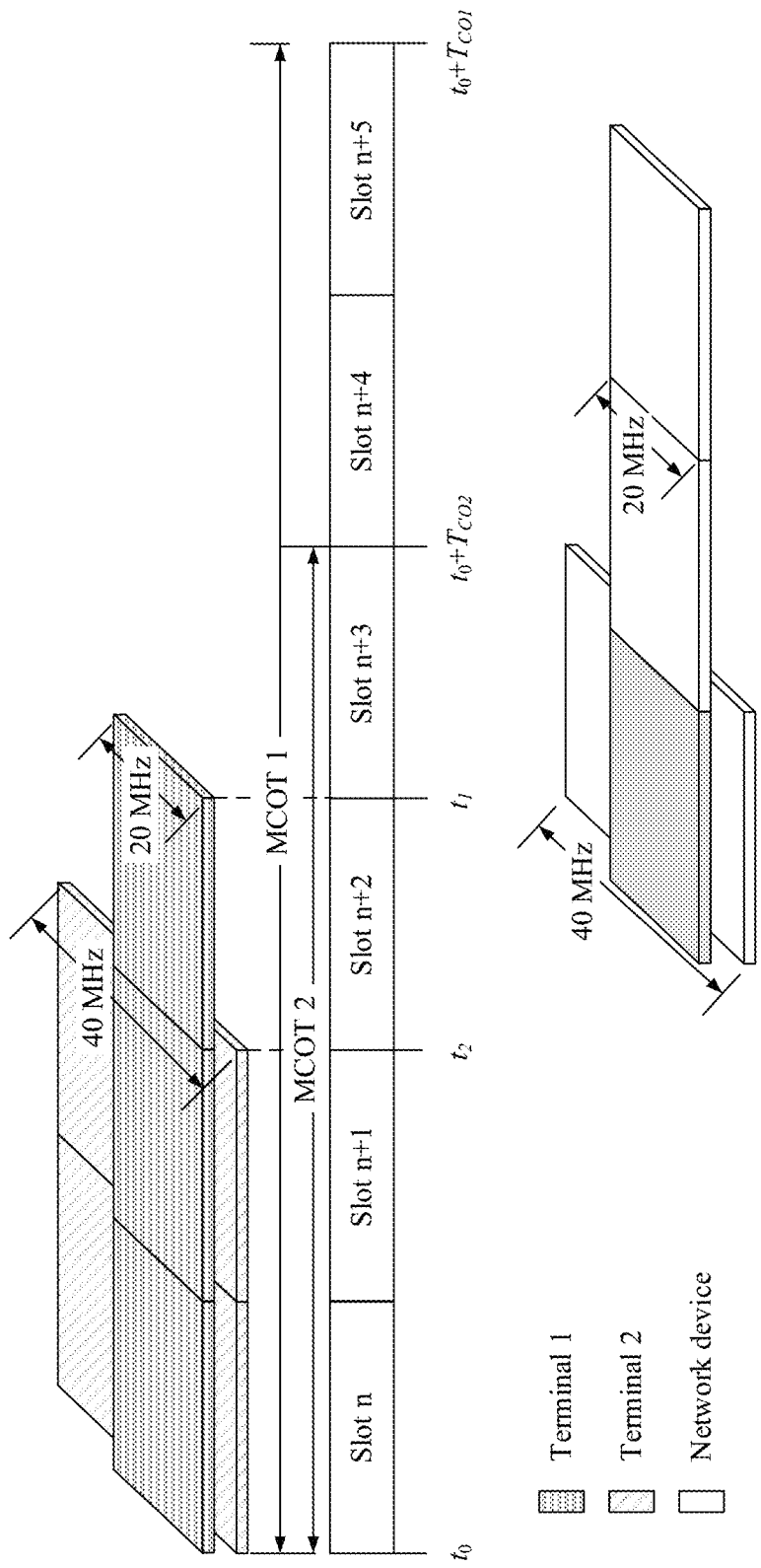
FIG. 10 is a schematic diagram of an intersection set of MCOTs of two terminals according to still another embodiment of this application.

Referring to FIG. 10, when there are a plurality of MCOTs, transmission resources of terminals have an intersection set. The intersection set of the transmission resources may be understood as an intersection set of MCOT duration and bandwidths of a plurality of terminals, and the network device may start downlink transmission in the intersection set. In different embodiments, depending on an object to which the network device sends the downlink transmission, the network device may send a downlink signal to the plurality of terminals in the intersection set. Alternatively, the network device may send, in the intersection set, the downlink signal to another terminal other than the plurality of terminals that is scheduled by the network device. Alternatively, the network device may send, in the intersection set, the downlink signal to the plurality of terminals and the another terminal other than the plurality of terminals that is scheduled by the network device. For ease of description, the intersection set may be referred to as an "intersection set part" in the following. Channel occupancy duration of a terminal 1 and channel occupancy duration of a terminal 2 have a duration overlapping part. First bandwidth of the terminal 1 and second bandwidth of the terminal 2 have a bandwidth overlapping part, and the intersection set part includes the duration overlapping part and the bandwidth overlapping part; and the network device may perform the downlink transmission in the bandwidth overlapping part after the duration overlapping part starts.

Still using the terminal 1 and the terminal 2 as an example, a moment $t_1$ at which the terminal 1 ends uplink transmission is later than a moment $t_2$ at which the terminal 2 ends the uplink transmission, and an end moment $t_0+T_{CO1}$ of MCOT1 of the terminal 1 is later than an end moment $t_0+T_{CO2}$ of MCOT2 of the terminal 2. An intersection set of the bandwidths of the terminal 1 and the terminal 2 is 20 MHz, and an intersection set of the duration of the MCOTs of the terminal 1 and the terminal 2 is $t_1$ to $t_0+T_{CO2}$. The network device may simultaneously initiate the downlink transmission to the terminal 1 and the terminal 2 in the intersection set part, so that the downlink signal can be simultaneously sent to the plurality of terminals through the downlink transmission, and communication efficiency can be improved by applying the intersection set part.

In another embodiment, if the network device does not need to perform the downlink transmission to the plurality of terminals that obtain the MCOTs, the network device may initiate, in the intersection set part, the downlink transmission to any one or more terminals scheduled by the network device other than the terminal 1 and the terminal 2. Therefore, the MCOTs obtained by the plurality of terminals can be effectively and flexibly used, and the communication efficiency is improved. According to another aspect, in an embodiment in which the intersection set part exists, the network device may maintain a timer for the intersection set part, to save resources.

Figure 11:
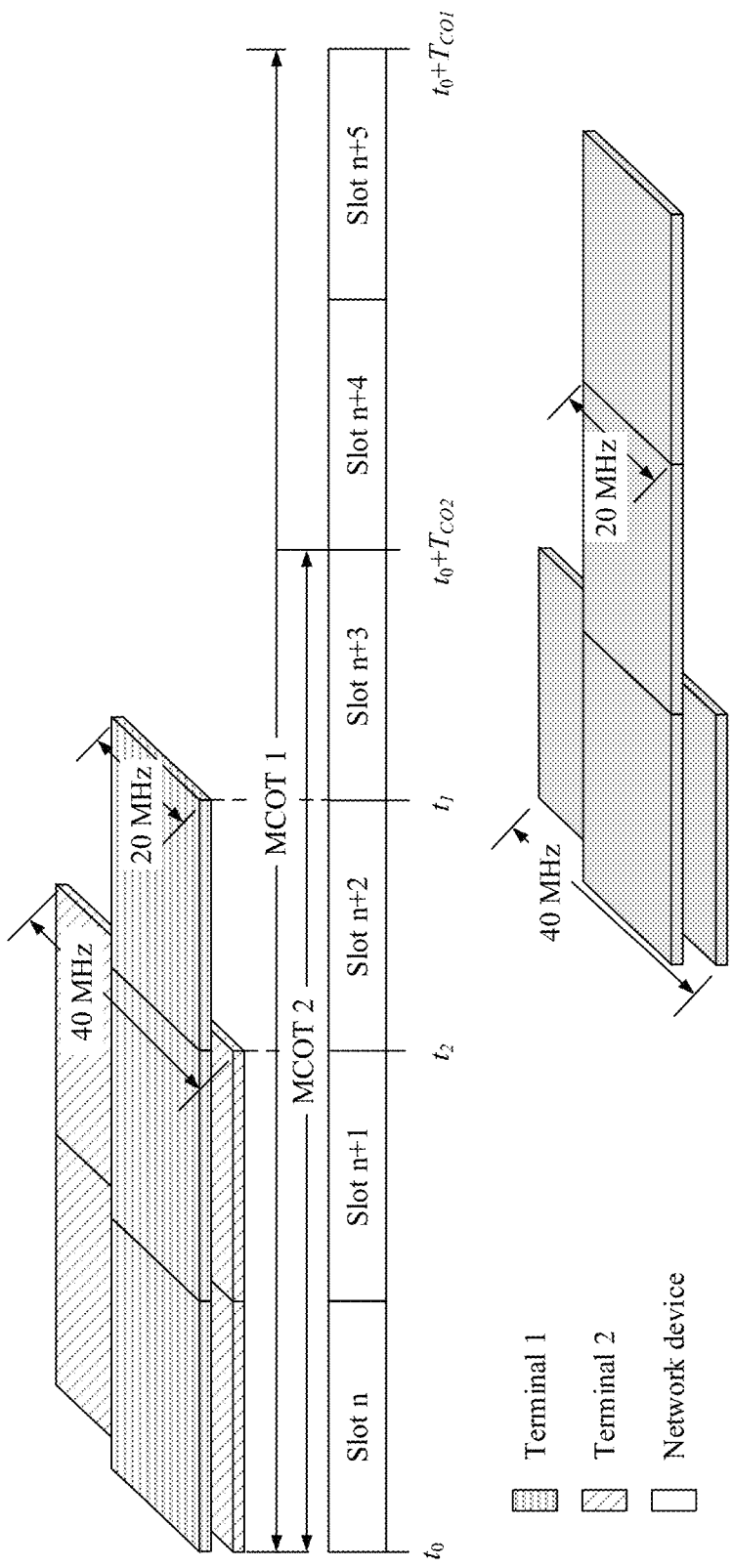
FIG. 11 is a schematic diagram of a union set of MCOTs of two terminals according to still another embodiment of this application.

Referring to FIG. 11, when there are a plurality of MCOTs, transmission resources of the terminals have a union set. The union set of the transmission resources may be understood as a combined part of MCOT duration and bandwidths of the plurality of terminals, and the network device may start downlink transmission in the union set.

In different embodiments, depending on an object to which the network device sends the downlink transmission, the network device may send a downlink signal to the plurality of terminals in the union set. Alternatively, the network device may send, in the union set, the downlink signal to another terminal other than the plurality of terminals that is scheduled by the network device. Alternatively, the network device may send, in the union set, the downlink signal to the plurality of terminals and the another terminal other than the plurality of terminals that is scheduled by the network device. For ease of description, the foregoing union set may be referred to as a "union set part" in the following.

Still using the terminal 1 and the terminal 2 as an example, the union set part includes a part of which a bandwidth is 40 MHz and duration is $t_1$ to $t_0+T_{CO2}$, and a part of which a bandwidth is 20 MHz and duration is $t_0+T_{CO2}$ to $t_0+T_{CO1}$. It should be noted that, in the part of which the bandwidth is 40 MHz and duration is $t_1$ to $t_0+T_{CO2}$, the bandwidth 20 MHz occupied by the terminal 1 is less than the union set part bandwidth. But when transmission of the terminal 1 can support 40 MHz, the network device may still initiate the downlink transmission to the terminal 1 at 40 MHz. Therefore, application of the union set part expands a downlink transmission range, and provides more flexible use.

In this implementation, the network device may simultaneously initiate the downlink transmission to the terminal 1 and the terminal 2 in the union set part, so that the downlink signal can be simultaneously sent to the plurality of terminals through the downlink transmission, and communication efficiency can be improved by applying the union set part.

In another embodiment, the network device may initiate, in the union set part, the downlink transmission to any one or more terminals scheduled by the network device other than the terminal 1 and the terminal 2. Therefore, the MCOTs obtained by the plurality of terminals can be effectively and flexibly used, and the communication efficiency is improved.

It should be noted that, in different embodiments, the network device may perform the downlink transmission by directly accessing the public bandwidth without performing the LBT after the plurality of terminals complete uplink transmission in the public bandwidth. Alternatively, when there is an interval between the uplink transmission and the downlink transmission, processing may be performed with reference to the foregoing embodiment of the terminal. It may be understood that, for a case in which the network device needs to perform LBT, there is an interval $T_g$ between the uplink transmission and the downlink transmission, and the like, refer to descriptions of one terminal in FIG. 3 to FIG. 8. Details are not described herein again.

In some embodiments, a priority of the downlink transmission service performed by the network device in second duration of a first terminal is related to a priority of the uplink transmission service performed by the first terminal in first duration. A priority of the downlink transmission service performed by the network device in fourth duration of a second terminal is related to a priority of the uplink transmission service performed by the second terminal in third duration.

In some other embodiments, when the plurality of terminals have a duration overlapping part, a priority of the downlink transmission service performed by the network device in the duration overlapping part of the plurality of terminals is related to one of a highest priority, a lowest priority, or an average priority of uplink transmission services of the plurality of terminals. Using the first terminal and the second terminal as an example, a priority of the downlink transmission service performed by the network device in the duration overlapping part of the first terminal and the second terminal is not lower than one of a highest priority, a lowest priority, or an average priority of the uplink transmission services of the first terminal and the second terminal.

The "related" refers to that the priority of the downlink transmission service of the network device is not lower than, not higher than, or equal to a priority of an uplink transmission service of a terminal. Alternatively, the priority of the downlink transmission service of the network device is not lower than, not higher than, or equal to one of a highest priority, a lowest priority, or an average priority of uplink transmission services of the plurality of terminals.

In some embodiments, when the network device performs the downlink transmission, a priority of a downlink service corresponding to the downlink transmission is related to a priority of the uplink transmission service completed by one or more terminals that obtain the MCOT. It should be noted that, the priority of the uplink transmission service completed by one or more terminals refers to that the terminal accesses a channel based on the priority when performing the uplink transmission. For a priority of an allowed downlink transmission service, reference needs to be made to a priority of a service completed by one or more terminals in the MCOT obtained by the one or more terminals. For example, in remaining channel occupancy duration of a terminal, downlink transmission of which a priority is not lower than that of the uplink transmission service completed by the terminal in the MCOT is allowed to be performed. In other words, if the priority of the downlink transmission service of the network device in the remaining channel occupancy duration of the terminal is lower than the priority of the uplink transmission service that has been completed by the terminal, the downlink transmission of the network device is not allowed. For example, for the priority of the uplink transmission service, reference may be made to a channel access priority (Channel Access Priority Class (p)) in an uplink channel access priority (Channel Access Priority Class for UL) in Table (Table) 15.2.1-1 in section 15.2.1 in TS36.213. However, this is not limited in this application.

For example, in some embodiments, a smaller value of a downlink service priority parameter corresponding to the downlink transmission indicates a higher priority. To be specific, the priority p=1 (p1) of the downlink transmission service is lower than or equal to the priority p=2 (p2) of the uplink transmission service. In some other embodiments, a smaller value of the downlink service priority parameter corresponding to the downlink transmission indicates a lower priority. To be specific, the priority p=1 of the downlink transmission service is higher than or equal to the priority p=2 of the uplink transmission service.

In a possible embodiment, for one terminal, there is one MCOT corresponding to the terminal. After the uplink transmission of the first terminal ends, if there is still remaining first channel occupancy duration, the network device starts the downlink transmission in the remaining part of the first channel occupancy duration. For example, the priority of the downlink transmission service performed by the network device is not lower than the priority of the uplink transmission service that has been completed by the first terminal in an MCOT of the first terminal (namely, the priority of the downlink transmission service of the network device is higher than or equal to the priority of the uplink transmission service that has been completed by the first terminal). Alternatively, the priority of the downlink transmission service performed by the network device is not higher than the priority of the uplink transmission service that has been completed by the first terminal in the MCOT of the first terminal (namely, the priority of the downlink transmission service of the network device is lower than or equal to the priority of the uplink transmission service that has been completed by the first terminal). Alternatively, the priority of the downlink transmission service performed by the network device is equal to the priority of the uplink transmission service that has been completed by the first terminal in the MCOT of the first terminal (namely, the priority of the downlink transmission service of the network device is equal to the priority of the uplink transmission service that has been completed by the first terminal).

In another possible embodiment, for a plurality of terminals, there may be a plurality of MCOTs corresponding to the plurality of terminals. For example, lengths of the plurality of MCOTs may be the same or may be different. Herein, two terminals, that is, the first terminal and the second terminal, are used as an example for description. After the uplink transmission of the first terminal and/or the second terminal ends, the network device may separately perform the downlink transmission within a remaining channel occupancy time of the first terminal and/or the second terminal. When the network device performs the downlink transmission in the remaining channel occupancy time corresponding to the first terminal, the priority of the downlink transmission service of the network device is not lower than the priority of the uplink transmission service that has been completed by the first terminal in the MCOT of the first terminal (namely, the priority of the downlink transmission service of the network device is higher than or equal to the priority of the uplink transmission service that has been completed by the first terminal). Alternatively, the priority of the downlink transmission service performed by the network device in the remaining channel occupancy time of the first terminal is not higher than the priority of the uplink transmission service that has been completed by the first terminal in the MCOT of the first terminal (namely, the priority of the downlink transmission service of the network device is lower than or equal to the priority of the uplink transmission service that has been completed by the first terminal). Alternatively, the priority of the downlink transmission service performed by the network device in the remaining channel occupancy time of the first terminal is equal to the priority of the uplink transmission service that has been completed by the first terminal in the MCOT of the first terminal (namely, the priority of the downlink transmission service of the network device is equal to the priority of the uplink transmission service that has been completed by the first terminal). When the network device performs the downlink transmission in the remaining channel occupancy time corresponding to the second terminal, the priority of the downlink transmission service of the network device is not lower than the priority of the uplink transmission service that has been completed by the second terminal in the MCOT of the second terminal (namely, the priority of the downlink transmission service of the network device is higher than or equal to the priority of the uplink transmission service that has been completed by the second terminal). Alternatively, the priority of the downlink transmission service performed by the network device in the remaining channel occupancy time of the second terminal is not higher than the priority of the uplink transmission service that has been completed by the second terminal in the MCOT of the second terminal (namely, the priority of the downlink transmission of the network device is lower than or equal to the priority of the uplink transmission service that has been completed by the second terminal). Alternatively, the priority of the downlink transmission service performed by the network device in the remaining channel occupancy time of the second terminal is equal to the priority of the uplink transmission service that has been completed by the second terminal in the MCOT of the second terminal (namely, the priority of the downlink transmission of the network device is equal to the priority of the uplink transmission service that has been completed by the second terminal).

In another possible embodiment, for a plurality of terminals, there are a plurality of MCOTs. For example, lengths of the plurality of MCOTs may be the same or may be different. The network device selects a remaining channel occupancy time of one or more terminals to perform the downlink transmission. The priority of the downlink transmission service of the network device is related to the priority of the uplink transmission service completed in a corresponding MCOT by one or more terminals selected by the network device. The priority of a downlink transmission service of the network device is not lower than the priority of the uplink transmission service that has been completed by the selected one or more terminals (namely, the priority of the downlink transmission service of the network device is higher than or equal to the priority of the uplink transmission service that has been completed by the selected one or more terminals). Alternatively, the priority of the downlink transmission service of the network device is not higher than the priority of the uplink transmission service that has been completed by the selected one or more terminals (namely, the priority of the downlink transmission service of the network device is lower than or equal to the priority of the uplink transmission service that has been completed by the selected one or more terminals). Alternatively, the priority of the downlink transmission service of the network device is equal to the priority of the uplink transmission service that has been completed by the selected one or more terminals (namely, the priority of the downlink transmission service of the network device is equal to the priority of the uplink transmission service that has been completed by the selected one or more terminals).

In another possible embodiment, for a plurality of terminals, there are a plurality of MCOTs. For example, lengths of the plurality of MCOTs may be the same or may be different. The network device may perform the downlink transmission in an intersection set of remaining channel occupancy times of the plurality of terminals. The priority of the downlink transmission service of the network device is not lower than a lowest priority, a highest priority, or an average priority of priorities of uplink transmission services that have been completed by the plurality of terminals in respective MCOTs (namely, the priority of the downlink transmission service of the network device is higher than or equal to the lowest priority, the highest priority, or the average priority of the priorities of the uplink transmission services that have been completed by the plurality of terminals). Alternatively, the priority of the downlink transmission service of the network device is not higher than the lowest priority, the highest priority, or the average priority of the priorities of the uplink transmission services that have been completed by the plurality of terminals in respective MCOTs (namely, the priority of the downlink transmission service of the network device is lower than or equal to the lowest priority, the highest priority, or the average priority of the priorities of the uplink transmission services that have been completed by the plurality of terminals). Alternatively, the priority of the downlink transmission service of the network device is equal to the lowest priority, the highest priority, or the average priority of the priorities of the uplink transmission services that have been completed by the plurality of terminals in respective MCOTs (namely, the priority of the downlink transmission service of the network device is equal to the lowest priority, the highest priority, or the average priority of the priorities of the uplink transmission services that have been completed by the plurality of terminals).

In another possible embodiment, for a plurality of terminals, there are a plurality of MCOTs. For example, lengths of the plurality of MCOTs may be the same or may be different. The network device may perform the downlink transmission in a union set of remaining channel occupancy times of the plurality of terminals. The priority of the downlink transmission service of the network device is not lower than a lowest priority, a highest priority, or an average priority of priorities of uplink transmission services that have been completed by the plurality of terminals in respective MCOTs (namely, the priority of the downlink transmission service of the network device is higher than or equal to the lowest priority, the highest priority, or the average priority of the priorities of the uplink transmission services that have been completed by the plurality of terminals). Alternatively, the priority of the downlink transmission service of the network device is not higher than the lowest priority, the highest priority, or the average priority of the priorities of the uplink transmission services that have been completed by the plurality of terminals in respective MCOTs (namely, the priority of the downlink transmission service of the network device is lower than or equal to the lowest priority, the highest priority, or the average priority of the priorities of the uplink transmission services that have been completed by the plurality of terminals). Alternatively, the priority of the downlink transmission service of the network device is equal to the lowest priority, the highest priority, or the average priority of the priorities of the uplink transmission services that have been completed by the plurality of terminals in respective MCOTs (namely, the priority of the downlink transmission service of the network device is equal to the lowest priority, the highest priority, or the average priority of the priorities of the uplink transmission services that have been completed by the plurality of terminals).

The foregoing describes a plurality of embodiments of the wireless communication method in this application by using examples. The following continues to describe embodiments of a network device, a terminal, and the like in this application by using examples.

The network device is first described by using an example. In a specific example, a structure of the network device includes a processor and a transceiver. In a possible example, the structure of the network device may further include a communications unit. The communications unit is configured to support the network device in communicating with another network side device, for example, communicating with a core network node. In another possible example, the structure of the network device may further include a memory. The memory is coupled to the processor, and is configured to store a program instruction and data that are necessary to the network device.

Figure 12:
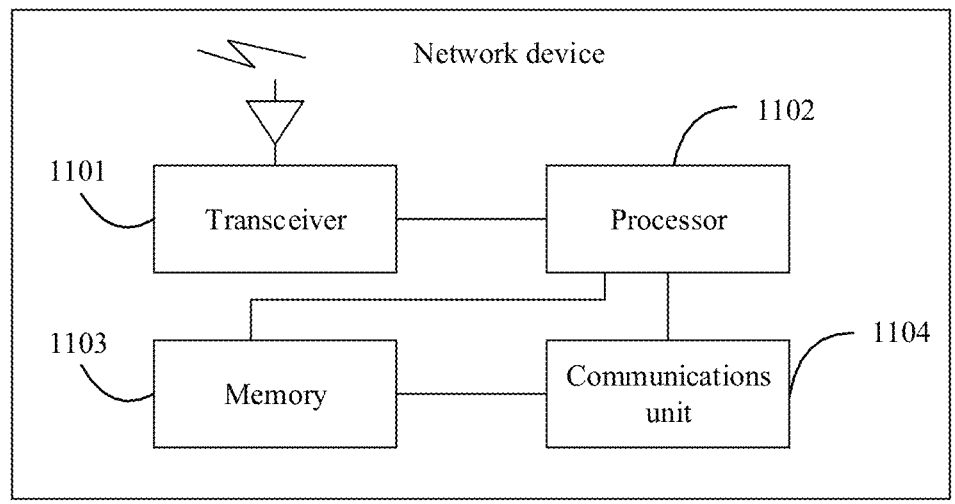
FIG. 12 is a simplified schematic structural diagram of a network device according to an embodiment of this application.

FIG. 12 is a possible schematic structural diagram of a network device according to the foregoing method embodiments. The network device may be a base station or another network side device having a base station function. In the structure shown in FIG. 12, the network device includes a transceiver 1101, a processor 1102, a memory 1103, and a communications unit 1104. The transceiver 1101, the processor 1102, the memory 1103, and the communications unit 1104 are connected by using a bus.

On a downlink, the transceiver 1101 performs an adjustment on an output sampling and generates a downlink signal for to-be-sent data (for example, a PDSCH) or signaling (for example, a PDCCH). The downlink signal is transmitted to the terminal in the foregoing embodiments by using an antenna. On an uplink, the antenna receives an uplink signal transmitted by the terminal in the foregoing embodiments, and the transceiver 1101 adjusts the signal received from the antenna and provides an input sampling. In the processor 1102, processing such as modulating the to-be-sent data, or generating an SC-FDMA signal is performed on service data and a signaling message. These units perform processing based on a radio access technology (for example, an access technology in an LTE system, a 5G system, and another evolved system) used by a radio access network. In the embodiments shown in FIG. 6 to FIG. 11, the transceiver 1101 is integrated by a transmitter and a receiver. In other embodiments, the transmitter and the receiver may alternatively be independent of each other.

The processor 1102 is further configured to control and manage the network device to perform the processing performed by the network device in the foregoing method embodiments. For example, the processor 1102 is configured to control the network device to perform downlink transmission and/or perform another process of the technology described in this application. In an example, the processor 1102 is configured to support the network device in performing the processing procedures related to the network device according to FIG. 2 to FIG. 11. When applied to an unlicensed scenario, the processor 1102 further needs to control the network device to perform channel listening, to transmit the data or the signaling. For example, the processor 1102 performs channel listening by using a signal received by the transceiver 1101 from a transceiver apparatus or the antenna, and controls the signal to be transmitted by using the antenna to preempt a channel. In different embodiments, the processor 1102 may include one or more processors, for example, include one or more central processing units (Central Processing Unit, CPU), and the processor 1102 may be integrated into a chip, or may be the chip itself.

The memory 1103 is configured to store related instructions and data, and program code and data of the network device. In different embodiments, the memory 1103 includes but is not limited to a random access memory (Random Access Memory, RAM), a read-only memory (Read-Only Memory, ROM), an erasable programmable read only memory (Erasable Programmable Read Only Memory, EPROM), or a compact disc read-only memory (Compact Disc Read-Only Memory, CD-ROM). In this embodiment, the memory 1103 is independent of the processor 1102. In another embodiment, the memory 1103 may be further integrated into the processor 1102.

For example, the processor 1102 is configured to control the transceiver 1101 to receive uplink transmission of a first terminal in first duration of channel occupancy duration of the first terminal, where the channel occupancy duration of the first terminal further includes second duration, and the second duration is later than the first duration. The processor 1102 is further configured to control the transceiver 1101 to perform downlink transmission in the second duration, where a sum of the first duration and the second duration is less than or equal to the channel occupancy duration of the first terminal.

In another possible embodiment, the processor 1102 is further configured to control the transceiver 1101 to receive uplink transmission of a second terminal in third duration of channel occupancy duration of the second terminal, where the channel occupancy duration of the second terminal further includes fourth duration, and the fourth duration is later than the third duration. The processor 1102 is configured to control the transceiver 1101 to perform the downlink transmission in fourth duration, where a sum of the third duration and the fourth duration is less than or equal to the channel occupancy duration of the second terminal. The first terminal occupies a first bandwidth, the second terminal occupies a second bandwidth, and the first bandwidth may be the same as or different from the second bandwidth.

It may be understood that, FIG. 12 shows only a simplified design of the network device. In different applications, the network device may include any quantity of transmitters, receivers, processors, memories, and the like. All network devices that may implement this application fall within the protection scope of this application.

The following describes a terminal by using an example. In a specific embodiment, a structure of the terminal includes a processor (or referred to as a controller), a transceiver, and a modem processor. In a possible example, the structure of the terminal may further include a memory. The memory is coupled to the processor, and is configured to store a program instruction and data that are necessary to the terminal.

Figure 13:
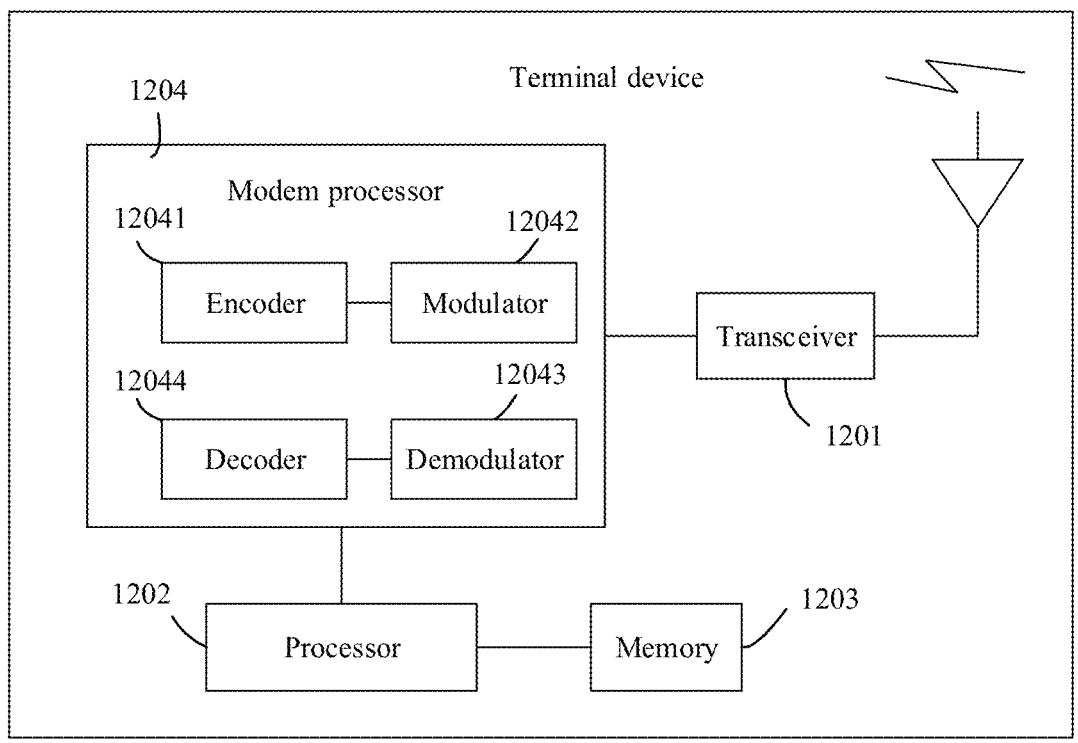
FIG. 13 is a simplified schematic structural diagram of a terminal according to an embodiment of this application.

FIG. 13 is a simplified schematic diagram of a possible design structure of a terminal according to the foregoing method embodiments. The terminal includes a transceiver 1201, a processor 1202, a memory 1203, and a modem 1204. The transceiver 1201, the processor 1202, the memory 1203, and the modem 1204 are connected by using a bus.

The transceiver 1201 performs adjustment (such as analog conversion, filtering, amplification, and up-conversion) on an output sampling and generates an uplink signal. The uplink signal is transmitted to the network device in the foregoing embodiments by using an antenna. On a downlink, the antenna receives a downlink signal from the network device in the foregoing embodiments. The transceiver 1201 adjusts (for example, filters, amplifies, down-converts, and digitizes) a signal received from the antenna and provides an input sampling. For example, in the modem processor 1204, an encoder 12041 receives service data and a signaling message that are to be sent on an uplink, and processes (for example, formats, encodes, and interleaves) the service data and the signaling message. A modulator 12042 further processes (for example, performs symbol mapping and modulates) encoded service data and an encoded signaling message, and provides the output sampling. A demodulator 12043 processes (for example, demodulates) the input sampling and provides a symbol estimation. The decoder 12044 processes (for example, deinterleaves and decodes) the symbol estimation and provides decoded data and a decoded signaling message that are to be sent to the terminal. The encoder 12041, the modulator 12042, the demodulator 12043, and the decoder 12044 may be implemented by the integrated modem processor 1204. These units perform processing based on a radio access technology (for example, an access technology in an LTE system, a 5G system, and another evolved system) used by a radio access network. In the embodiment shown in FIG. 13, the transceiver 1201 is integrated by a transmitter and a receiver. In another embodiment, the transmitter and the receiver may alternatively be independent of each other.

The processor 1202 controls and manages the terminal, and is configured to perform the processing performed by the terminal in the foregoing method embodiments. For example, the processor 1202 is configured to control the terminal to perform uplink transmission and/or other processes of the technology described in this application. In an example, the processor 1202 is configured to support the terminal in performing the processing procedures related to the terminal according to FIG. 2 to FIG. 11. For example, the transceiver 1201 is configured to control/use the antenna to receive a downlink transmission signal. In different embodiments, the processor 1202 may include one or more processors, for example, include one or more CPUs, and the processor 1202 may be integrated into a chip, or may be the chip itself.

The memory 1203 is configured to store related instructions and data, and program code and data of the terminal. In different embodiments, the memory 1203 includes but is not limited to a random access memory (Random Access Memory, RAM), a read-only memory (Read-Only Memory, ROM), an erasable programmable read only memory (Erasable Programmable Read Only Memory, EPROM), a non-transitory computer readable storage medium (non-transitory computer readable storage medium) or a compact disc read-only memory (Compact Disc Read-Only Memory, CD-ROM). In this embodiment, the memory 1203 is independent of the processor 1202. In another embodiment, the memory 1203 may be further integrated into the processor 1202.

For example, the processor 1202 is configured to: obtain channel occupancy duration, and control/use the transceiver 1201 to perform uplink transmission, where the channel occupancy duration includes at least first duration and second duration, and the first duration is used for the uplink transmission of the terminal. The processor 1201 is configured to control/use the transceiver 1202 to receive, in the second duration, downlink transmission from a network device, where a sum of the first duration and the second duration is less than or equal to the channel occupancy duration.

It may be understood that, FIG. 13 shows only a simplified design of the network device. In different applications, the network device may include any quantity of transmitters, receivers, processors, memories, and the like. All network devices that may implement this application fall within the protection scope of this application.

In a possible embodiment, this application further proposes a wireless communications apparatus applied to a network device. The wireless communications apparatus includes a processor. The processor is configured to: be coupled to a memory, read an instruction in the memory, and perform, based on the instruction, operations related to the network device in the foregoing embodiments. In this embodiment, the wireless communications apparatus applied to the network device may be understood as a chip or a chip apparatus, and the memory of the wireless communications apparatus is independent of the chip.

In another possible embodiment, this application further provides another wireless communications apparatus applied to a network device. The wireless communications apparatus includes at least one processor and one memory. The memory is coupled to the at least one processor, and the at least one processor is configured to perform operations related to the network device in the foregoing embodiments. In this embodiment, the wireless communications apparatus applied to the network device may be understood as a chip or a chip apparatus, and a memory of the wireless communications apparatus is integrated inside the chip.

In a possible embodiment, an embodiment of this application further provides a wireless communications apparatus applied to a terminal. The wireless communications apparatus includes a processor. The processor is configured to: be coupled to a memory, read an instruction in the memory, and perform, based on the instruction, operations related to the terminal in the foregoing embodiments. In this embodiment, the wireless communications apparatus applied to the terminal may be understood as a chip or a chip apparatus, and a memory of the wireless communications apparatus is independent of the chip.

In another possible embodiment, an embodiment of this application provides a wireless communications apparatus applied to a terminal. The wireless communications apparatus includes at least one processor and one memory. The memory is coupled to the at least one processor, and the at least one processor is configured to perform operations related to the terminal in the foregoing embodiments. In this embodiment, the wireless communications apparatus applied to the terminal may be understood as a chip or a chip apparatus, and a memory of the wireless communications apparatus is integrated inside the chip.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

A person skilled in the art should be aware that in the foregoing one or more examples, functions described in this application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The invention claimed is:

1. A terminal, comprising a processor and a transceiver connected to the processor, wherein
   the processor is configured to: obtain a channel occupancy duration of the terminal, and control the transceiver to perform uplink transmission, wherein the channel occupancy duration of the terminal comprises at least a first duration and a second duration, and the first duration is used for the uplink transmission of the terminal, wherein a network device receives uplink transmission from a second terminal in a channel occupancy duration of the second terminal, where the channel occupancy duration of the terminal and the channel occupancy duration of the second terminal have a duration overlapping part; and
   the processor is configured to control the transceiver to receive, after the duration overlapping part starts, downlink transmission from the network device, wherein a sum of the first duration and the second duration is less than or equal to the channel occupancy duration of the terminal.

2. The terminal according to claim 1, wherein at least one time interval is between the first duration and the second duration, when the at least one time interval is less than or equal to a preset value, the channel occupancy duration comprises the at least one time interval.

3. The terminal according to claim 2, wherein the preset value is 25 μs.

4. The terminal according to claim 1, the transceiver is configured to report one or more of the following parameters to the network device: maximum channel occupancy time (MCOT) duration, uplink transmission duration, remaining available MCOT duration.

5. A wireless communication method, comprising:
obtaining, by a terminal, a channel occupancy duration of the terminal, and performing uplink transmission, wherein the channel occupancy duration of the terminal comprises at least a first duration and a second duration, and the first duration is used for the uplink transmission of the terminal, wherein a network device receives uplink transmission from a second terminal in a channel occupancy duration of the second terminal, where the channel occupancy duration of the terminal and the channel occupancy duration of the second terminal have a duration overlapping part; and
receiving, after the duration overlapping part starts, downlink transmission from the network device to at least one of the terminal or the second terminal, wherein a sum of the first duration and the second duration is less than or equal to the channel occupancy duration of the terminal.

6. The method according to claim 5, wherein at least one time interval is between the first duration and the second duration, when the at least one time interval is less than or equal to a preset value, the channel occupancy duration of the terminal comprises the at least one time interval.

7. The method according to claim 6, wherein the preset value is 25 µs.

8. The method according to claim 7, wherein the terminal uses a grant-free transmission manner for the uplink transmission.

9. The method according to claim 8, the terminal reports one or more of the following parameters to the network device: maximum channel occupancy time (MCOT) duration, uplink transmission duration, remaining available MCOT duration.

10. A non-transitory computer-readable storage medium comprising instructions which, when executed by a terminal, cause the terminal to perform operations comprising:
obtaining, a channel occupancy duration of the terminal, and performing uplink transmission, wherein the channel occupancy duration of the terminal comprises at least a first duration and a second duration, and the first duration is used for the uplink transmission of the terminal, wherein a network device receives uplink transmission from a second terminal in a channel occupancy duration of the second terminal, where the channel occupancy duration of the terminal and the channel occupancy duration of the second terminal have a duration overlapping part; and
receiving, after the duration overlapping part starts, downlink transmission from the network device, wherein a sum of the first duration and the second duration is less than or equal to the channel occupancy duration of the terminal.

11. The non-transitory computer-readable storage medium according to claim 10, wherein at least one time interval is between the first duration and the second duration, when the at least one time interval is less than or equal to a preset value, the channel occupancy duration comprises the at least one time interval.

12. The non-transitory computer-readable storage medium according to claim 11, wherein the preset value is 25 µs.

13. The non-transitory computer-readable storage medium according to claim 10, wherein the uplink transmission is by a grant-free transmission manner.

14. The non-transitory computer-readable storage medium according to claim 13, wherein the terminal further performs operations comprising:
reporting one or more of the following parameters to the network device: maximum channel occupancy time (MCOT) duration, uplink transmission duration, remaining available MCOT duration.

* * * * *